(12) United States Patent
Shand et al.

(10) Patent No.: US 8,462,664 B2
(45) Date of Patent: Jun. 11, 2013

(54) IDENTIFICATION OF DUAL PLANE TOPOLOGIES

(75) Inventors: Ian Michael Charles Shand, Cobham (GB); Stewart Frederick Bryant, Merstham (GB)

(73) Assignee: Cisco Technology, Inc., San Jose, CA (US)

(*) Notice: Subject to any disclaimer, the term of this patent is extended or adjusted under 35 U.S.C. 154(b) by 204 days.

(21) Appl. No.: 12/899,013

(22) Filed: Oct. 6, 2010

(65) Prior Publication Data

US 2012/0087280 A1 Apr. 12, 2012

(51) Int. Cl.
*H04L 12/28* (2006.01)
(52) U.S. Cl.
USPC .......................................... 370/254; 370/255
(58) Field of Classification Search
USPC ................ 370/252, 254, 255, 256, 351, 389, 370/392
See application file for complete search history.

(56) References Cited

U.S. PATENT DOCUMENTS

| | | | |
|---|---|---|---|
| 5,606,669 A * | 2/1997 | Bertin et al. ................ 709/223 |
| 6,678,241 B1 * | 1/2004 | Gai et al. .................... 370/216 |
| 6,751,746 B1 | 6/2004 | Jain et al. |
| 6,940,825 B2 * | 9/2005 | Goldman et al. ............ 370/256 |
| 7,051,113 B1 | 5/2006 | Katukam et al. |
| 7,263,100 B2 * | 8/2007 | Hauser et al. ............ 370/395.41 |
| 7,292,585 B1 * | 11/2007 | Slaughter et al. ........... 370/400 |
| 7,330,440 B1 * | 2/2008 | Bryant et al. ............... 370/254 |
| 7,373,543 B1 | 5/2008 | Jain et al. |
| 7,477,594 B2 | 1/2009 | Saleh et al. |
| 7,490,165 B1 | 2/2009 | Katukam et al. |
| 7,542,414 B1 | 6/2009 | Katukam |
| 7,558,218 B1 | 7/2009 | Swallow |
| 7,593,348 B2 * | 9/2009 | Kodialam et al. ........... 370/254 |
| 7,633,949 B2 | 12/2009 | Zadikian et al. |
| 7,693,061 B2 | 4/2010 | El-Sakkout et al. |
| 7,756,035 B2 * | 7/2010 | Bragg et al. ................. 370/235 |
| 7,787,404 B2 * | 8/2010 | Zhang et al. ................ 370/311 |
| 7,920,566 B2 * | 4/2011 | Bryant et al. ............... 370/392 |
| 7,978,594 B2 * | 7/2011 | Kodialam et al. ........... 370/216 |
| 7,984,137 B2 * | 7/2011 | O'Toole et al. ............. 709/224 |
| 7,995,497 B2 * | 8/2011 | Mehra ........................ 370/254 |
| 2006/0250948 A1 | 11/2006 | Zamfir et al. |
| 2009/0016311 A1 | 1/2009 | Wu et al. |
| 2009/0201805 A1 | 8/2009 | Begen et al. |

* cited by examiner

*Primary Examiner* — Dang Ton
*Assistant Examiner* — Brian O Connor
(74) *Attorney, Agent, or Firm* — Cesari and McKenna, LLP

(57) ABSTRACT

In one embodiment, two neighboring nodes adjacent to each end-point node of a domain may be associated with a "dual" (a logical structure). A first of the two neighboring nodes may be placed into a first family (and group) of the dual, while a second of the two neighboring nodes may be placed into an opposing second family (and group). Augmentations may then be performed, recursively merging and connecting the duals and/or groups, as well as connecting unplaced nodes to particular duals, families, and groups, according to forced augmentations and/or unforced augmentations where no forced augmentations exist. In the end, it may be determined whether the domain supports dual plane topologies based on whether a solution having one resultant dual with a single group in each opposing family is reached from the recursive augmentations.

27 Claims, 17 Drawing Sheets

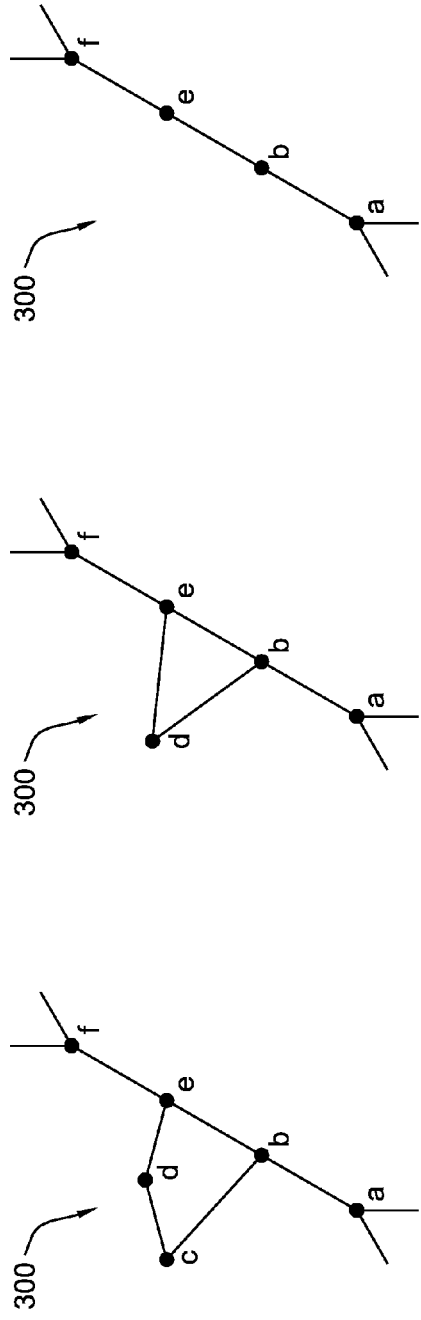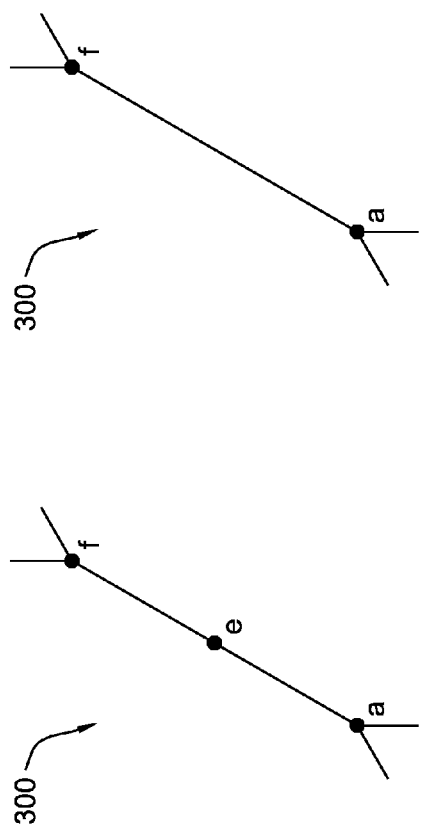
FIG. 3A
FIG. 3B
FIG. 3C
FIG. 3D
FIG. 3E

IDENTIFICATION OF DUAL PLANE TOPOLOGIES

TECHNICAL FIELD

The present disclosure relates generally to computer networks, and, more particularly, to identifying dual plane topologies in computer networks.

BACKGROUND

In many applications of high availability networks, e.g. live-live dual stream multicast, it is often necessary to define a network topology such that there exist two diverse paths between every pair of communicating edge-nodes. Typically such networks are designed by building a completely parallel pair of topologies and attaching each communicating node to both topologies. It would be useful, however, to be able to take an existing network topology and determine whether or not it was dual plane. It would also be useful to check that modification to an existing dual plane topology would maintain its dual plane properties, or to suggest modifications to a non-dual plane topology in order to make it dual plane.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3E, 4A-4C, 5B, 6, 7A-7C, 8A, and 8B illustrate various portions of computer networks and corresponding examples of algorithm components associated with identification of dual plane topologies;

DESCRIPTION OF EXAMPLE EMBODIMENTS

Overview

Figure 1:
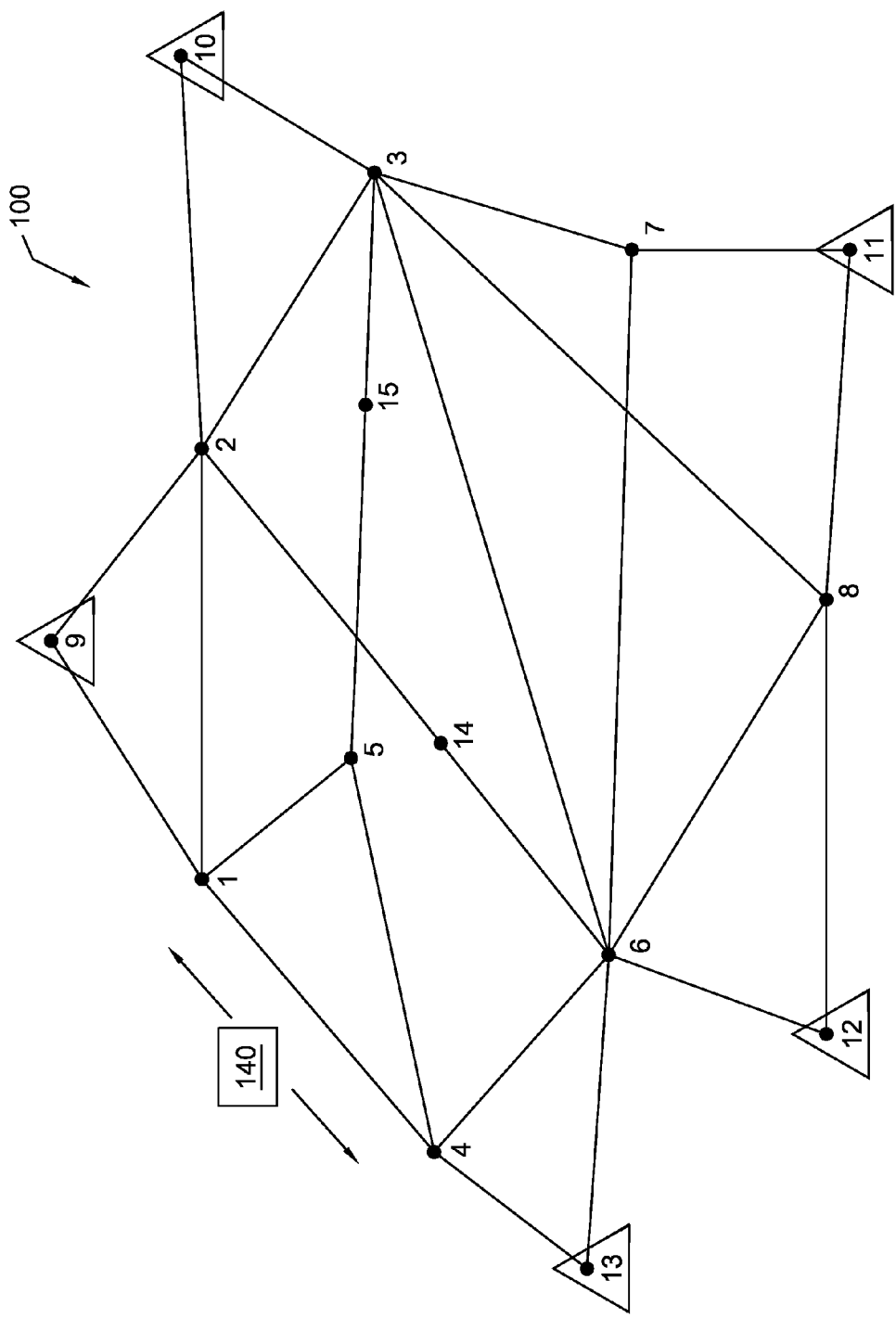
FIG. 1 illustrates an example computer network.

According to one or more embodiments of the disclosure, for each particular end-point node in a computer network domain that desires node-diverse dual plane topologies to each other end-point node in the domain, two neighboring nodes adjacent to each end-point node may be associated with a "dual" (a logical structure defined herein). In particular, a first of the two neighboring nodes may be placed into a first family (and group) of the dual, while a second of the two neighboring nodes may be placed into an opposing second family (and group) of the dual. Augmentations may then be performed, recursively merging and connecting the duals and/or groups, as well as connecting unplaced nodes to particular duals, families, and groups, according to forced augmentations and/or unforced augmentations (e.g., which may be "unwound") where no is forced augmentations exist. In the end, it may be determined whether the domain supports dual plane topologies based on whether a solution having one resultant dual with a single group in each opposing family is reached from the recursive augmentations.

DESCRIPTION

A computer network, generally, is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into is multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level, or any other type of computer network with definable boundaries, is generally referred to as a "domain."

FIG. 1 is a schematic block diagram of an example computer network 100 illustratively comprising nodes/devices, such as nodes 1-15 interconnected by links as shown. Illustratively, nodes 1-15 may comprise routers, switches, bridges, terminals, etc., and are meant to illustrate a network topology between end-point nodes (e.g., 9-13, shown in triangles) via a network of intermediate nodes (e.g., 1-8 and 14-15). Those skilled in the art will understand that any number of nodes, devices, links, etc. may be used in the computer network, and that the view shown herein is for simplicity. Those skilled in the art will also understand that while the embodiments described herein is described generally with reference to a domain, it may apply to any network configuration within an Autonomous System (AS) or area (level), or throughout multiple ASes or areas (levels), service provider domains, customer networks, etc. Also, as used herein, the links between the nodes may be referred to as "link X-Y," where X and Y are neighboring devices on either end of the particular link (and where "link X-Y" is the same as "link Y-X" unless otherwise noted).

Data packets 140 (e.g., traffic sent between the client and server) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
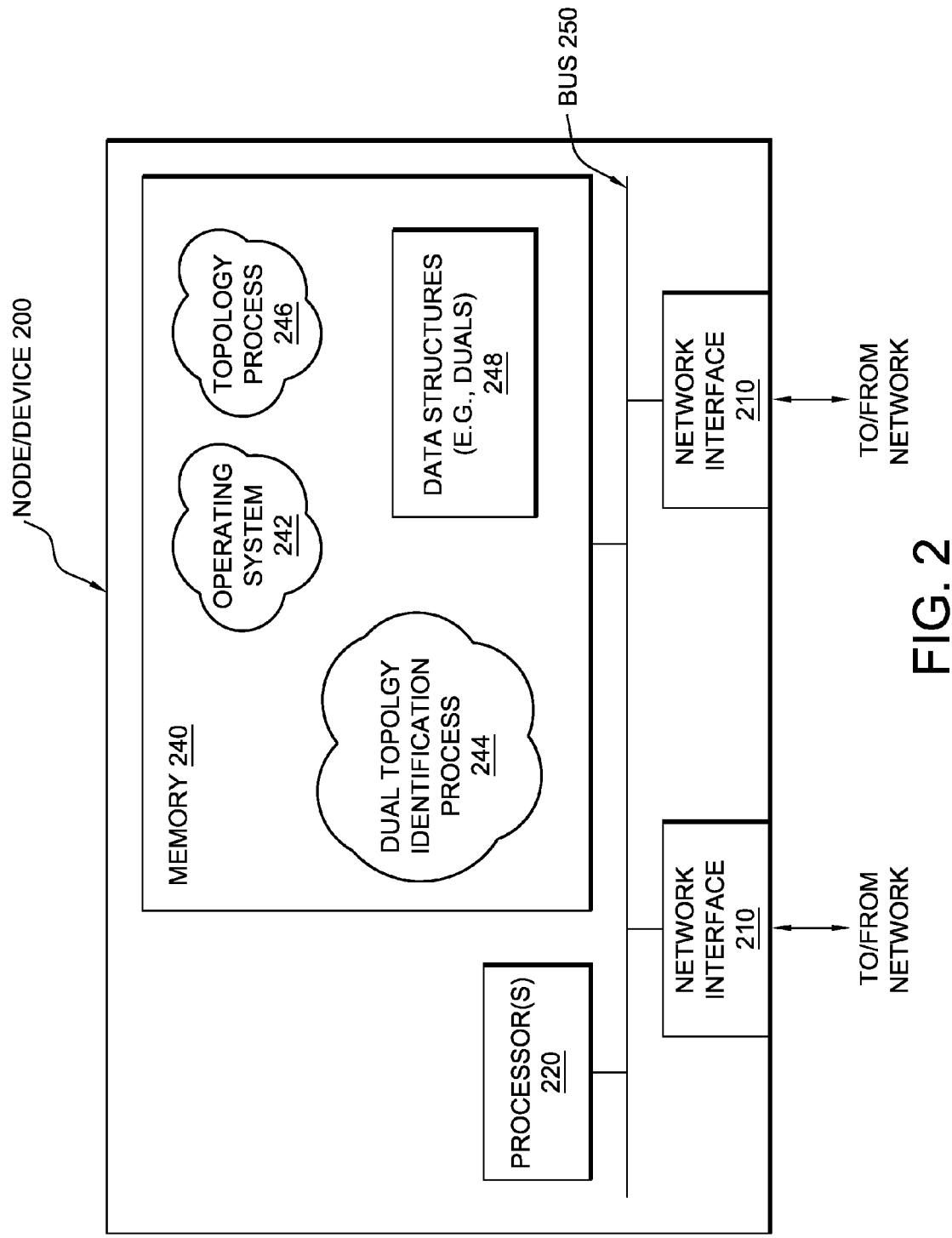
FIG. 2 illustrates an example network device/node.

FIG. 2 is a schematic block diagram of an example node/device 200 that may be used with one or more embodiments described herein, e.g., as a computational device on one or more of nodes 1-15 or other device not specifically a part of network 100 (but with knowledge of network 100's topology). The device comprises one or more network interfaces 210, one or more processors 220, and a memory 240 interconnected by a is system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor(s) 220 for storing software programs and data structures associated with the embodiments described herein. The processor 220 may comprise necessary elements or logic adapted to execute the software programs and manipulate the data structures 248. An operating system 242, portions of which are typically resident in memory 240 and executed by the processor(s), functionally organizes the node by, inter alia, invoking operations in support of software processes and/or services executing on the device. These software processes and/or services may comprise an illustrative dual-plane topology identification process 244, and a topology process 246. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

Topology process 246 contains computer executable instructions executed by processor 220 to perform functions provided by one or more topology protocols, such as various routing protocols (e.g., where node 200 is a member of the network topology 100). These functions may be configured to manage a database (e.g., structure 248) containing data describing the interconnections between nodes of a particular network domain 100. For instance, routing protocols may comprise the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by is those skilled in the art. Alternatively, such as where the node 200 is external to network 100, the topology process may simple be a database populated by external configuration.

As noted above, high availability networks, such as live-live dual stream multicast, benefit from a network topology with two diverse paths between every pair of communicating edge-nodes (end-points). In particular, a dual plane network is defined as a network where a pre-selected set of end-point nodes interested in having dual plane topologies each have at least a dual attachment to the rest of the network, that is, has at least two links connected each to a different neighboring node, and there are two node-diverse paths between any two end-points.

Another way to describe a dual plane topology is through the use of "colors," where in a dual plane topology there exist a coloring of nodes and links such that:

a blue node is an end-point node as described above;
each node that is not blue is either red (a first family) or green (an opposing second family) or grey (not belonging to either family);
each link is either red or green or grey;
each green node has only green or grey links connected to it;
each red node has only red or grey links connected to it;
a red link is connected to red or blue nodes only;
a green link is connected to green or blue nodes only;
a grey link is connected to anything (but not used for traffic);
a blue node can have a red and/or green and/or grey links connected to it;
a blue node must have at least one red and one green link connected to it; and
each pair of blue nodes has at least two disjoint paths between them, one of which has only green links and the other only red links.

While conventional techniques to achieve dual-plane networks involves pre-configuration of a network with that intent, it would be useful to be able to take an existing network topology and determine whether or not it was dual plane. As mentioned above, it would also be useful to check that modification to an existing dual plane topology would maintain its dual plane properties, or to suggest modifications to a non-dual plane topology in order to make it dual plane.

There are numerous solutions for computing diverse paths from a single source to a single destination. There are also solutions for computing diverse paths from multiple sources to a single destination. However, there are currently no solutions for computing diverse paths from multiple sources to multiple destinations, and more particularly, for determining whether a network is a dual plane network.

Identifying Dual Plane Topologies

According to one or more embodiments of the disclosure, techniques are described that, given a network domain topology (graph) having a plurality of end-point nodes desiring node-diverse dual plane topologies to each other end-point node in the domain, determine whether the network domain is dual plane. While an analytic solution to the general problem is generally NP-complete, the algorithms described herein permit a solution to be found for most real world network topologies in a short amount of time (e.g., under one second). As described in more detail below, the algorithm takes into consideration requirements of the end-point nodes, forced augmentations based on the interconnectedness of the topology, and recursively visiting unforced augmentation selections until a solution is found (i.e., the network is dual plane), or until the problem is deemed insoluble (i.e., the network is not dual plane).

Illustratively, the techniques described herein may be performed by hardware, software, and/or firmware, such as in accordance with a dual-plane topology identification process 244, which may contain computer executable instructions executed by the processor 220 to perform functions relating to the novel techniques described herein, e.g., in conjunction with topology process 246 (or data structure 248) operating as described above. Notably, as described herein, the techniques may be performed on a single node within the computer network (e.g., one of the nodes 1-15) or other singular node not part of the network, operating with knowledge of the entire network topology. In this instance, the results of the performance may be distributed to the nodes of the network, or otherwise reported, e.g., to an administrator. Conversely, the techniques may be performed on a plurality of distributed nodes within the computer network domain. For instance, this is possible where each node has an identical copy of the network topology (e.g., link state routing protocols), and where each node utilizes a same (e.g., standardized) selection algorithm for any selections to be made while performing the technique. Each node in a distributed computation may thus process the entire network topology, or may alternatively process a portion of the network topology and share the results for a global identification of dual plane topologies.

Operationally, the solution comprises a number of steps, a first of which is to identify the end-point nodes (i.e., the nodes which desire to have dual plane connectivity to each other end-point node in the domain), and, for example, color them as blue nodes. As shown in the topology of FIG. 1, the end-points are nodes 9-13, shown within triangles. These nodes may be particularly configured as end-point nodes, or this may be dynamically determined, for instance, based on specific requests from clients, applications, etc., as may be understood by those skilled in the art.

Once the end-point nodes are determined, then the topology may optionally be simplified by locating any (non-end-point/non-blue) node which has exactly two links. These nodes may then be removed and replace by a single link connecting the two adjacent nodes (e.g., if no such link already existed). This may be recursively repeated until no further two-link nodes are present. In other words, a domain may be simplified by recursively replacing nodes with exactly two links to respective first and second neighbors with a link between the first and second neighbors. The rationale of this simplification is that such nodes cannot contribute to the solution, and are merely "pass-through" nodes.

FIGS. 3A-E illustrate an example simplification in this manner. For example, FIG. 3A shows a network domain segment 300 showing a collection of interconnected nodes "a-f". In particular, since node c is a two-link node, it may be removed and replaced by a link, as shown in FIG. 3B. Also, node d is a two-link node, so as shown in FIG. 3C, it may also be removed, and since a link already exists between nodes b and e, no replacement link is needed. Continuing the recursions, it can now be seen that node b, which was originally not a two-link node, has become a two-link node due to the simplifications, and is as such, may also be removed and replaced, as illustrated in FIG. 3D. Finally, node e, also newly identified as a two-link node, may also be removed and replaced, as shown in FIG. 3E. In other words, FIGS. 3A-E illustrate that since no matter which path is taken between nodes a and f in this topology, nodes a and f must be connected, so any intermediate nodes may be removed in order to simplify the topology.

Notably, the removed nodes should be remembered so that on finding a solution for dual plane topologies, the original topology can be reconstructed to place each replaced node into a family and group corresponding to the family and group of the respective "replacement" link (e.g., matching the link's color). For example, if the "link" between nodes a and f is "green," then all nodes a-f and their associated interconnecting links should also be "green" when reconstructing the actual (physical) topology.

With the determined end-point nodes (blue nodes), two neighboring nodes adjacent to each particular end-point node may also be determined, and connected by (or associated with, generally) a logical structure, herein called a "dual." That is, a dual is created for each end-point node, and is defined herein as a logical structure that represents a collection of nodes and links placed in one of either a first family or an opposing second family, where a family has one or more groups, each group representing a collection of nodes and links within a particular family that have connectivity to one another without traversing nodes in another family. A dual may be stored in memory 240 as a data structure 248, and may be managed and maintained by the dual plane topology process 244.

Figure 4A:
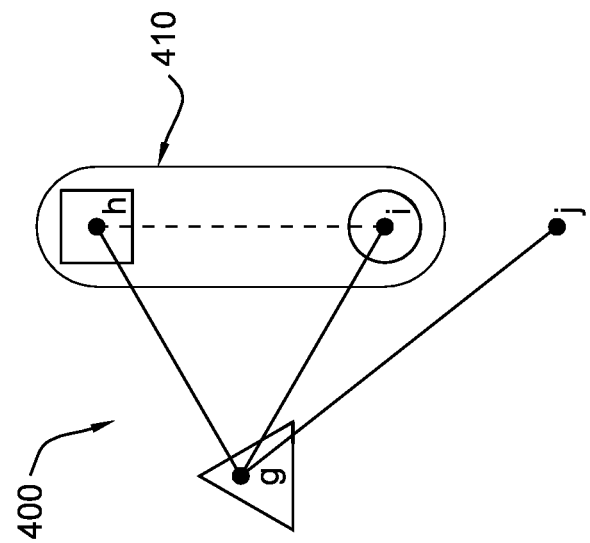

FIG. 4A illustrates an example network domain segment 400 comprising node g (an end-point) and nodes h and i (neighboring nodes adjacent to the end-point). As shown, the two neighboring nodes h and i may be joined by a dual 410. These nodes may then be placed in opposing families, e.g., arbitrarily or based on other factors (lowest identifier values, etc.), and in specific groups for each family. For instance, a first of the two neighboring nodes (h) may be placed into a first family (e.g., shown as a square) and group of that dual 410, while a second of the two neighboring nodes (i) of that dual may be placed into an opposing second family (e.g., shown as a circle) and group of that dual. Note that the two nodes may, or may not, be already connected by a link 412. If such a link exists, it is disabled, since it will not be used to transmit traffic due to the neighboring nodes being in opposite families.

Figure 4B:
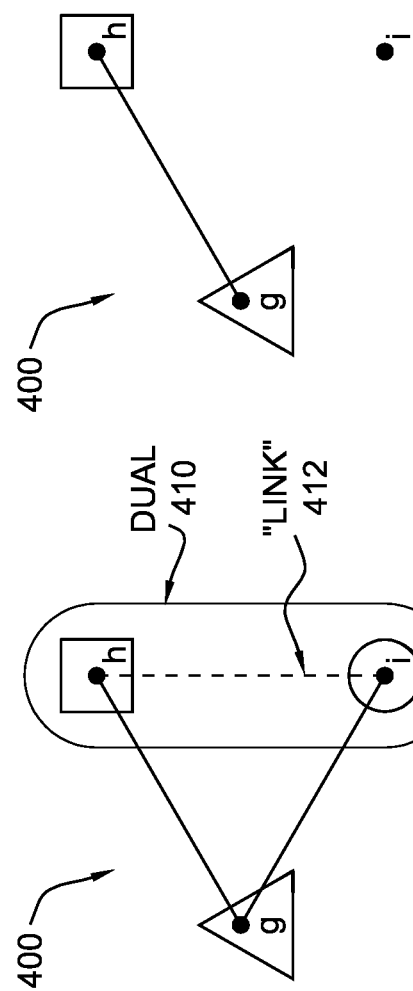

In the event that there exists an end-point node that has only a single adjacent neighbor (e.g., a blue node with only a single link), then it may be determined that the problem is insoluble, and that the domain does not support dual plane topologies for at least that end-point. There may be instances, for example, where it is desired to determine whether the remaining end-point nodes have dual connectivity, and as such, the singly connected end-point may be noted and ignored for the remainder of the computation. FIG. 4B illustrates an example of segment 400 where end-point node g is not connected to node i, and as such, cannot have dual connectivity to anything.

Figure 4C:
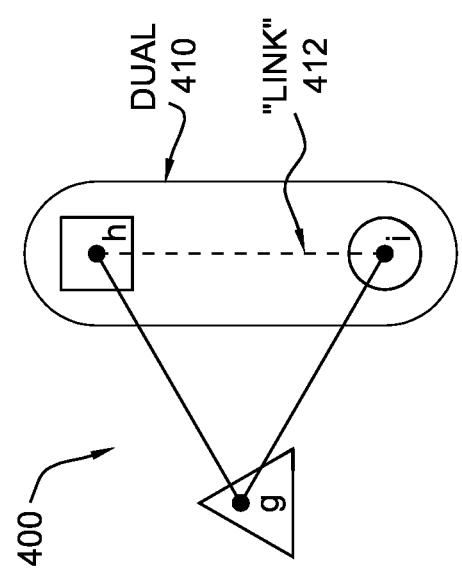

Conversely, as shown in FIG. 4C, if there exists an end-point node with more than two links (i.e., more than two neighbors, such as additional node j), then a pair of the neighbors may be selected (e.g., arbitrarily). Note that, as described below, the alternative neighbors should be remembered as it may have to be revised later (i.e., the selection is an unforced augmentation selection that is eligible for "unwinding"). According to one or more alternative embodiments, it may be beneficial to first perform the analysis (e.g., with forced augmentations only, described below) with only end-point nodes that are dual attached, and then if a solution is reached, attempt to add those end-point nodes with greater than two neighbors to the already determined dual plane topology. If the first analysis with only dual attached end-points does not solve with only forced augmentations (but is not insoluble), then the end-point nodes with more than two neighbors may be added to the topology for computation of recursive unforced augmentations (described herein).

As mentioned, once the initial set of duals corresponding to each end-point is determined, then one or more augmentations may be performed, e.g., recursively, to attempt to expand and merge the duals by augmentations which are either "forced" (e.g., subsuming singly connected nodes/groups) or "unforced" (e.g., where a plurality of possible selections may be made). Notably, unforced augmentations may be performed is when no forced augmentations exist, thus giving priority to forced augmentations, accordingly. Generally, an augmentation may comprise any one of the following actions, each explained in more detail below:

merging duals, e.g., those that share a placed node (one already in a first or second family and corresponding group);

connecting duals over a link between two placed nodes of each dual, e.g., where the duals do not share a placed node, and then merging the connected duals;

connecting groups (i.e., two nodes of a same group) of a same family within a dual over a link between the two nodes; and connecting unplaced nodes to a particular dual, that is, over a link between a placed node of the particular dual and the unplaced node, in order to place the unplaced nodes into the particular dual and a corresponding family and group of the connected placed node.

As noted, a group of a dual comprises nodes of the same family that are connected with other nodes in the dual having the same family without traversing a node in the dual of the opposite family. Accordingly, it may be determined whether the domain supports dual plane topologies based on whether a solution having one resultant dual with a single group in each opposing family is reached from the recursive augmentations. Said differently, a solution is reached when there exists a single dual having only two groups (one for a first family, e.g., red, and one for the second family, e.g., green), such that each end-point node has connectivity to each other end-point node over both the first and second node diverse groups (or families, since a solution produces a 1:1 relationship).

In more detail, forced augmentations may generally occur when there is a single link exiting a group (a single node group or group with a plurality of nodes), such that the link and the node reached across it must be in the same group (and thus family and dual) in order to allow that group to be reachable. Notably, if a group has multiple exits, but they all connect to the same group of another dual, or multiple groups all having the same family, then the exit can be treated as single exit. There are two specific implementations of forced augmentations. Namely, if the single link connects two duals having nodes of the same family (e.g., color), then the duals are merged into a single dual structure, placing the single link in the particular family. If, on the other hand, the single link connects two duals through two nodes of opposing families, then one of the duals must first be inverted ("flipped") to align the families. That is, the family of all of the nodes of one of the two distinct duals are inverted (changed from first to second or second to first) such that the two connected nodes are in a same family in order to allow merging the two distinct duals into a single dual over the single link.

Figure 5B:
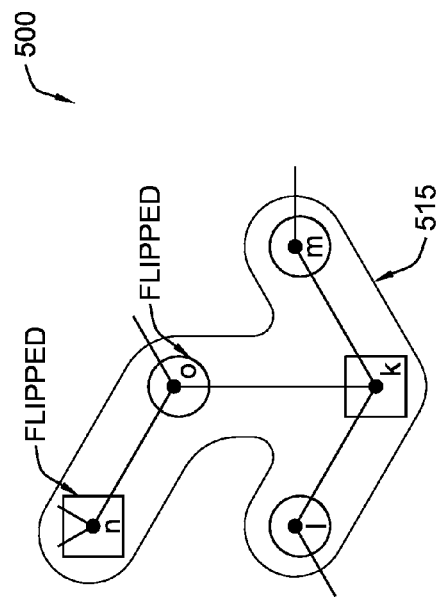
Figure 5A:
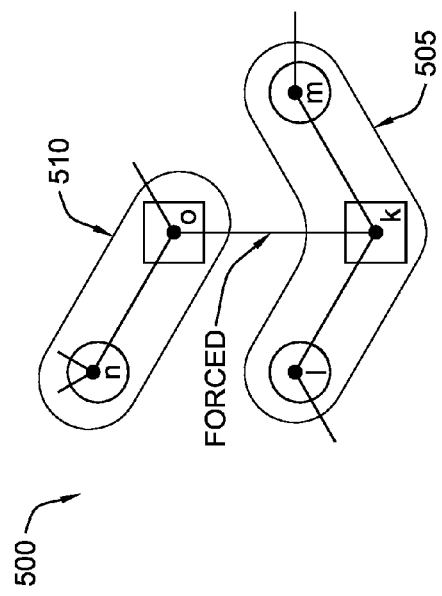

FIG. 5A illustrates an example network domain segment 500 showing a plurality of nodes k-o. In particular, nodes k-m are in a first dual 505, and nodes n-o are in a second dual 510. Assuming that node k is in its own group of dual 505, since it is in a different family from nodes 1 and m of that dual, then there is only one exit from that group, namely, link k-o. As such, this link is forced to connect to link k to allow connectivity to link k's group. As shown in FIG. 5B, the duals are merged into a single dual 515, and since the original dual 510 had different family labels than dual 505, when the link was added the families of dual 510 were flipped, accordingly.

Figure 6:
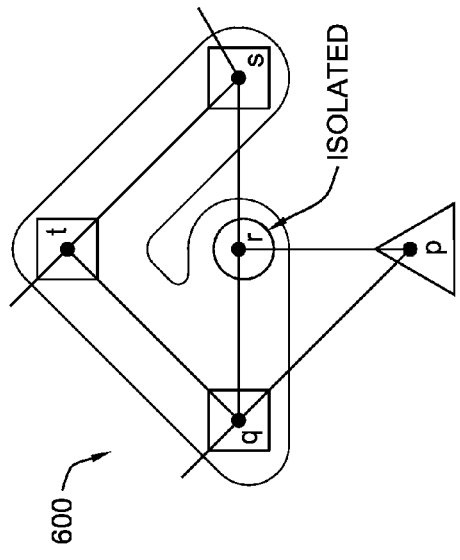

Note that if at any stage during the "forced" augmentations a group of any dual becomes isolated, i.e., there are no feasible links which could be used to connect the group to other nodes of that group (that is, to any other nodes), then the problem is insoluble, and it is determined that the domain does not support dual plane topologies. This is illustrated in FIG. 6, which shows a network domain segment 600 having nodes p-t arranged and grouped such that node r has become completely isolated, and has no manner to reach any other node without traversing a node of a different family.

In some cases, the forced augmentations may solve the problem without any unforced augmentations. For instance, certain forced augmentations may recursively create other forced augmentations until the problem is solved. However, in most cases, the forced moves should either prove the problem insoluble, or reach an unsolved state where there are multiple unforced choices for the next augmentation. For example, this is may occur where there are two or more possible links exiting a particular node/group. At this stage it is necessary to make a recursive exploration by choosing (e.g., arbitrarily or otherwise) one of the possibilities and pursuing that, first by any newly created forced augmentations, and then by additional unforced augmentations, until either a solution is reached, or an insoluble state arises.

Figure 7C:
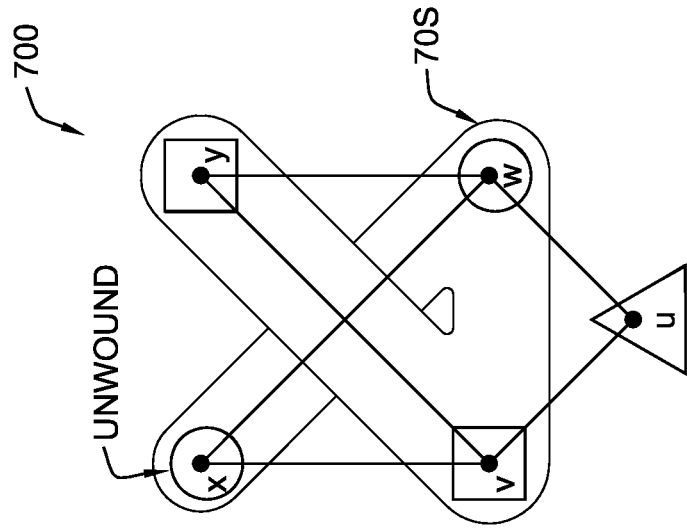
Figure 7B:
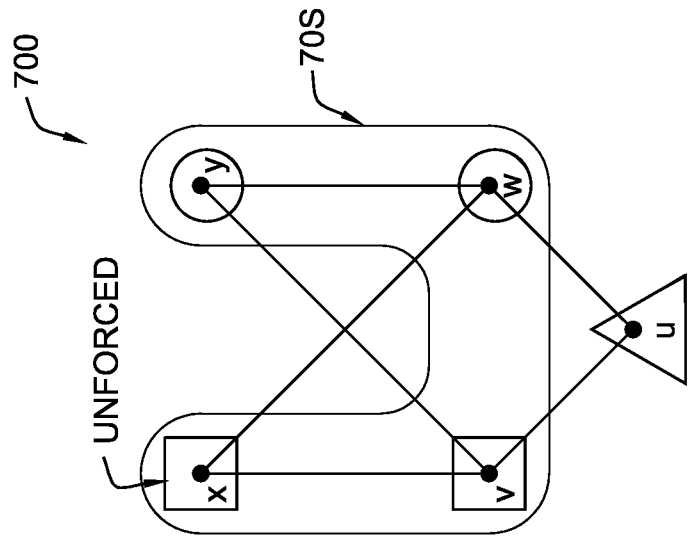
Figure 7A:
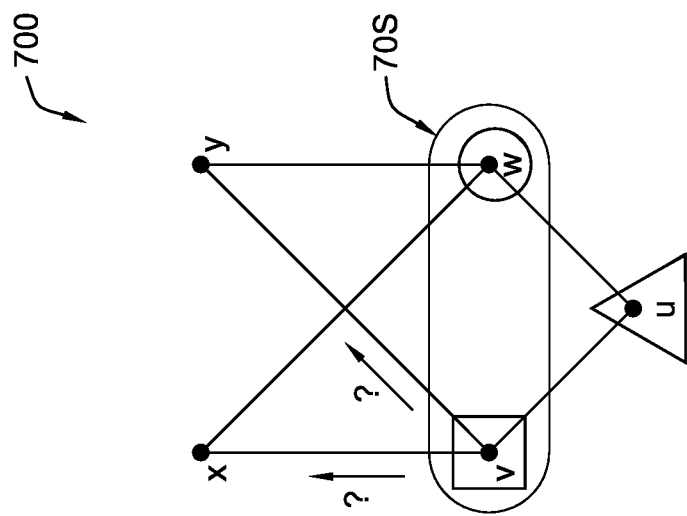

For instance, FIG. 7A illustrates a network domain segment 700 having nodes u-y arranged in families as shown. Nodes x and y in particular have yet to be placed in either family, and as such, nodes v and w (of dual 705) may each be connected to either (that is, each of nodes v and w are multi-exit nodes/groups). Once determining a plurality of possible augmentations over links from a particular node (e.g., node v), one of the options may be selected (e.g., link v-x to node x), such that the unforced augmentation is made accordingly as shown in FIG. 7B (e.g., adding node x to the dual 705 in node v's group/family). At this time, a forced augmentation may be created, such that node w has only a single exit to node y, and as such, the forced move may also be made to connect node y to the group/family of node w. If no forced augmentations were created, then additional unforced augmentations may also be pursued.

In the event, however, that an unforced augmentation selection leads to an insoluble state, then one or more selections may be "unwound" and other alternative possible augmentations may be selected. (Note that end-point nodes having more than two links are also included in these explorations.) For instance, if the decision in FIG. 7B results in an insoluble state, then the selection may be unwound to select an alternative augmentation, as shown in FIG. 7C. Note also that in FIG. 7C, a forced augmentation is again made to connect node w to node x now. Multiple levels of unforced augmentations may be unwound, such that if a decision at one unforced augmentation leads to a "branch" having another unforced augmentation, then the latter unforced augmentation may first be unwound, and then if that doesn't work, the former unforced augmentation may be unwound.

In order to optimize the search for a solution when unforced augmentations are involved, the link selections may optionally be prioritized as follows:

1. First, if there is a link which would connect/join two duals, select that link;

2. Second, if there is a link which would connect/join two groups of the same family on the same dual, select that link; and 3. Third/otherwise, selecting a link arbitrarily.

(Note that these prioritizations may need to be unwound, and are simply an optimization that should result in better convergence more often than not.)

Based on the unforced augmentations and any subsequent forced or unforced augmentations, a solution may be reached where it can be determined that the domain supports dual plane topologies. At this time, if any alternative unforced augmentations have not yet been visited (selected) through unwinding, then it may be possible to determine whether other solutions exist via those alternative unforced augmentation selections by unwinding the selections anyway. If, on the other hand, all possibilities for unforced augmentations have been exhausted without reaching the desired solution, however, the problem is declared insoluble, and it may be correspondingly determined that the domain does not support dual plane topologies. (Note, too, that "all" unforced augmentations may be based on a set limit/depth of augmentations to explore.)

Figure 8B:
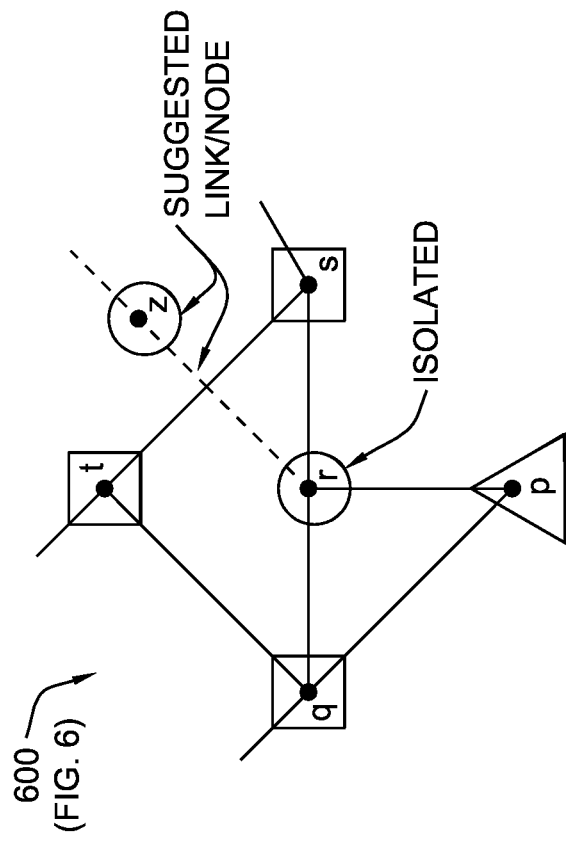
Figure 8A:
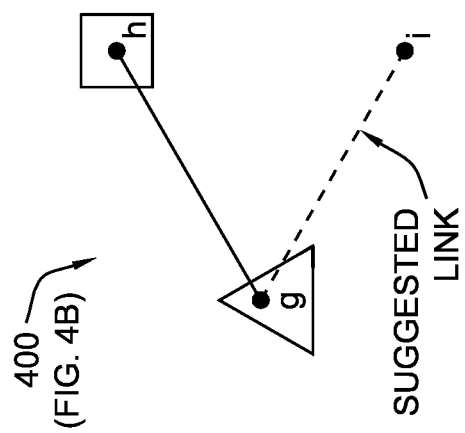

In response to determining that the domain does not support dual plane topologies, whether from forced augmentations only or in combination with exhausting all unforced augmentations, then it may be possible to determine and suggest one or more topology changes that may be made to allow the domain to support dual plane topologies. For instance, the dual plane topology process 244 may be configured to provide one or more suggested interconnections (new links) or additional nodes in order to provide connectivity to produce a dual plane topology, or at least to correct encountered problems. (That is, the suggestions may be determined based on where the algorithm "failed," and other problems may not have been discovered yet.) Alternatively, these suggestions may come from a system administrator with visibility of the failed outcome, and working knowledge of proper connectivity. For example, as shown in FIG. 8B, is assuming the network domain segment 400 of FIG. 4B, it may be suggested to add a link between node g and node i (or other nearby nodes) in order to provide dual connectivity for the end-point node g, since that would be where the algorithm above would have failed when determining two neighbors for node g. Alternatively, as shown in FIG. 8B, to correct the problem encountered in FIG. 6 with an isolated group, a suggestion to add a new link to another node z (or to even add the node z if necessary) may be made.

Further, according to one or more embodiments herein, where the domain does support dual plane topologies, the two families (groups) may be translated into distinct topology labels (e.g., colors) in order to allow various forwarding/routing protocols to forward packets 140 over the node diverse topologies. For instance, opposing multi-topology routing (MTR) topologies may be established based on the solution's two opposing families, as may be appreciated by those skilled in the art. If multiple possible dual plane topologies exist, then a selection may be made to use a particular dual plane topology based on various metrics, such as total link costs in each topology (e.g., a lowest metric sum of all the links in each family) or other factors.

FIGS. 9A-9I illustrate an example identification of a dual plane topology using the network domain 100 from FIG. 1, with nodes 9, 10, 11, 12, and 13 as end-point nodes (shown again in triangles). Note that this example does not show all possible outcomes of the algorithm, but merely represents an example network and application of certain components described above as required to achieve a solution. Beginning with FIG. 9A, it can be seen that a topology reduction has been completed (simplification), such that two-link nodes 14 and 15 have been reduced such that those nodes are represented simply as links directly between their neighbors (e.g., link 6-2 and link 5-3).

Figure 9A:
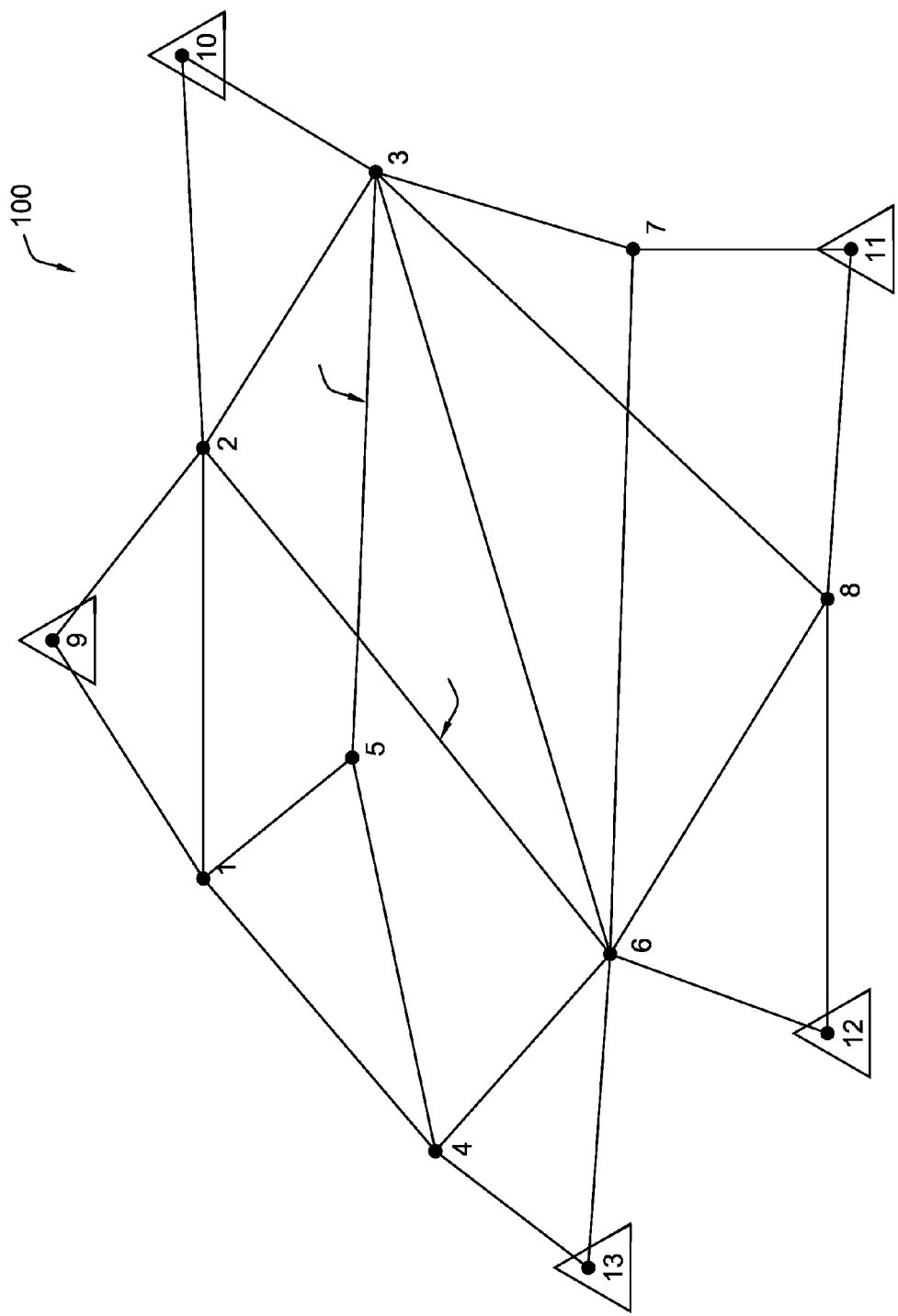
FIGS. 9A-9I illustrate an example identification of dual plane topologies.
Figure 9B:
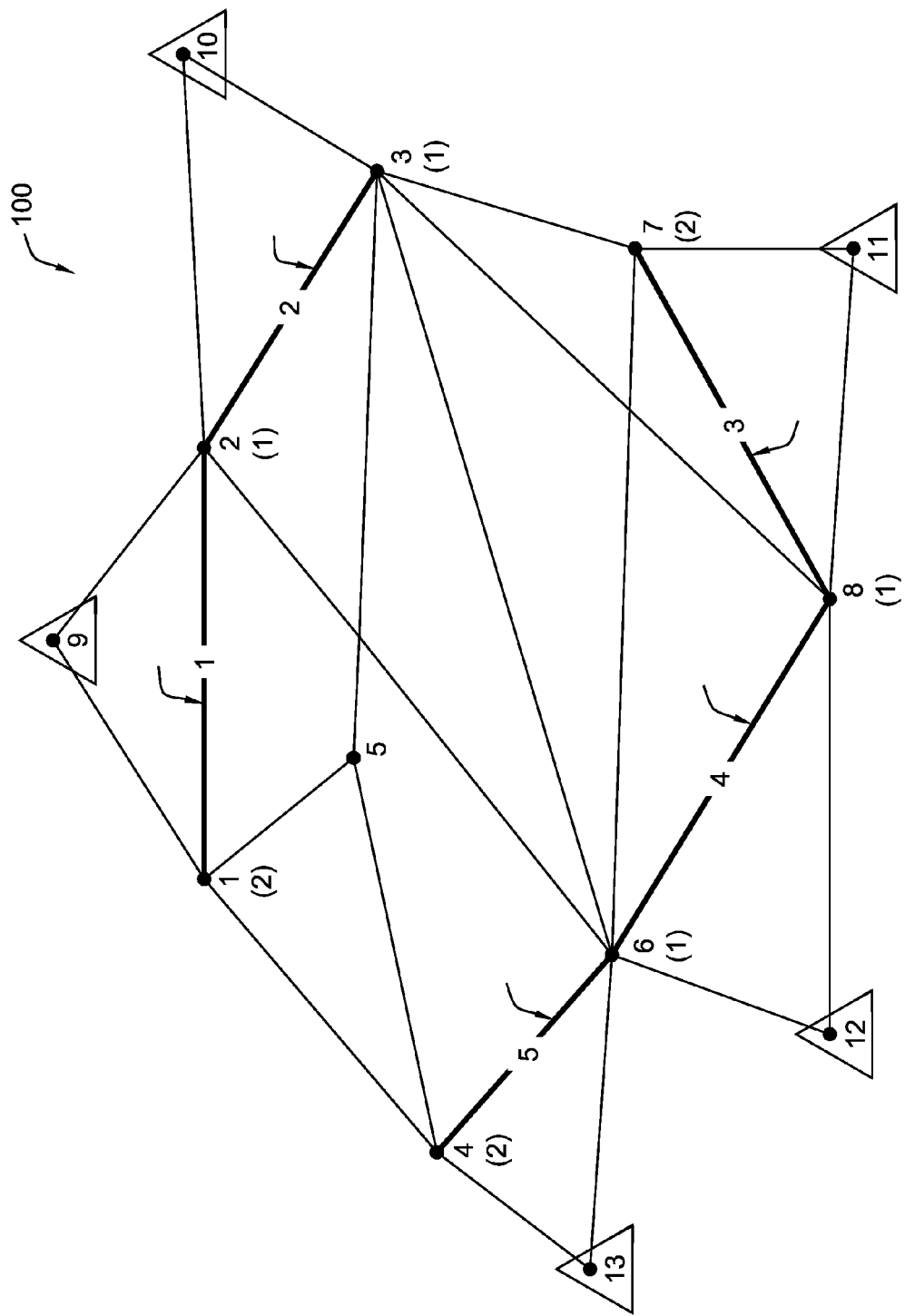

As shown in FIG. 9B, for each of the end-point nodes, the two corresponding neighbor nodes are added to respective duals. For instance, the following links (and corresponding nodes) may be added to duals (e.g., data structure 248) as follows (with dual numbers shown on the links in the Figures, and group numbers shown in parentheses):

add link 2-1 to dual 1;
add link 3-2 to dual 2;
add link 8-7 to dual 3;
add link 8-6 to dual 4; and
add link 6-4 to dual 5.

Note that these duals may, or may not, coincide with existing links (shown now as bolded/thicker lines). If there were no existing link, one would be created by the dual, though that is not required in this example. So, for example, if there were no link between nodes 7 and 8, a new "link" would be created for the dual, resulting in a topology similar to the one shown in FIG. 9A, though no physical underlying link actually existed. Since the links between the two nodes (e.g., 7 and 8) would be disabled anyway, the "link" is merely used to interconnect nodes of the dual. Note also that the links attaching the end-point nodes to the duals are no longer considered as part of the topology for the computation (that is, you can't use a link to an end-point node for anything other than connecting that end-point node to the dual).

Figure 9C:
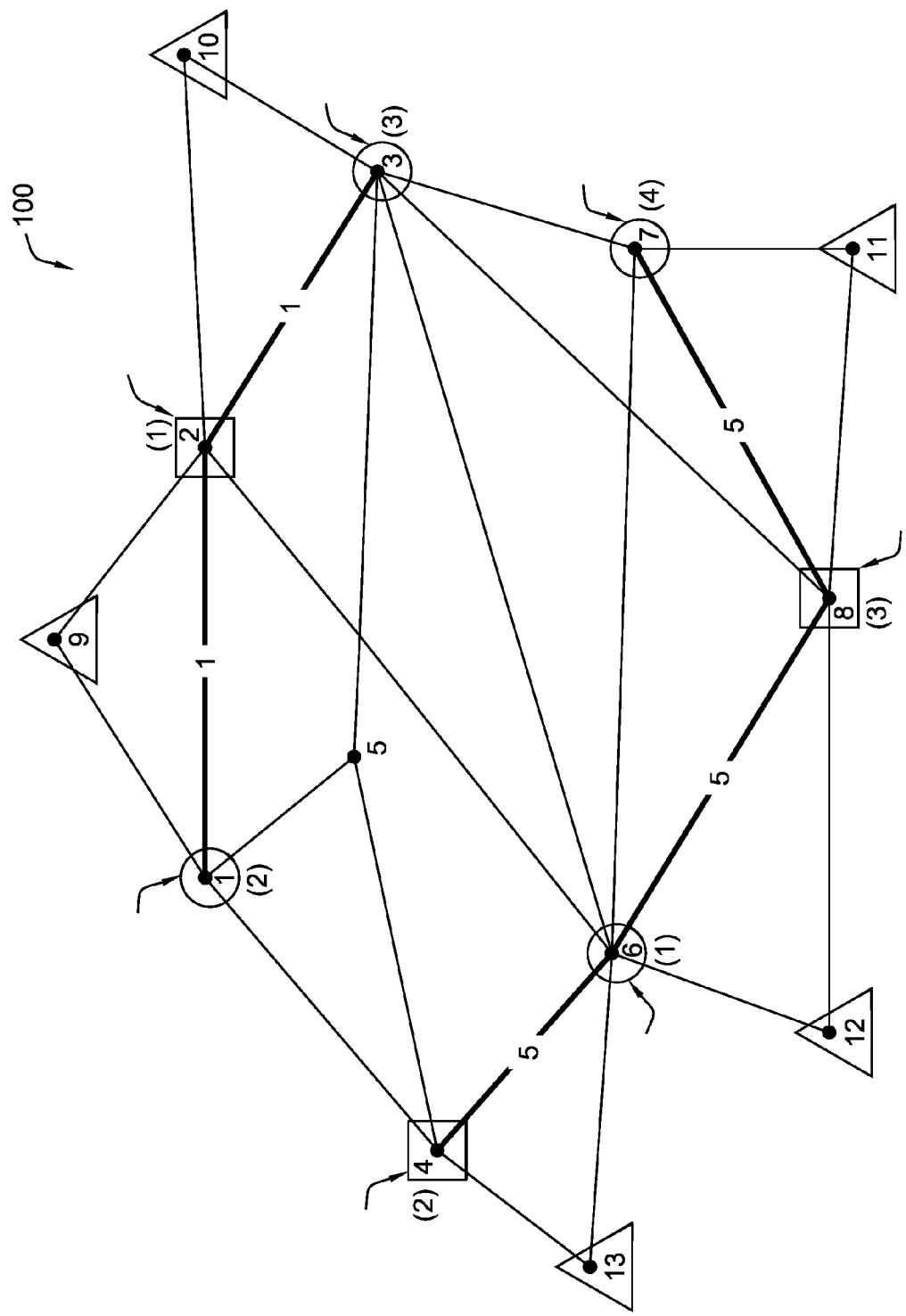

As shown in FIG. 9C, the duals which are touching (sharing a placed node) must now be merged. In particular:

dual 1 is merged with dual 2 (result: dual 1);
dual 5 is merged with dual 4 (result: dual 5); and
dual 5 is then also merged with dual 3 (result: dual 5).

As can be seen, there are now two independent duals (1 & 5). Note that the group numbers are currently independent within each dual, since it is as of yet unknown how each of these nodes is going to be reached (or equivalently, exited from). Accordingly, dual 1 has three groups, and dual 5 has four groups. Also, as shown in FIG. 9C, each of the nodes have been placed into a particular family, illustratively showing a node's family as either a square for family 1 (e.g., red), or a circle for family 2 (e.g., green). The current duals are then:

Dual 1:
Link 2-1->node 2 (Family 1, Group 1) and node 1 (Family 2, Group 2); and
Link 3-2->node 3 (Family 2, Group 3) and node 2 (Family 1, Group 1);

Dual 5:
Link 6-4->node 6 (Family 2, Group 1) and node 4 (Family 1, Group 2);
Link 8-6->node 8 (Family 1, Group 3) and node 6 (Family 2, Group 1); and
Link 8-7->node 8 (Family 1, Group 3) and node 7 (Family 2, Group 4).

The dual plane topology process 244 may now attempt to augment the existing duals. In this particular implementation, the nodes are examined in ascending order looking for a "forced move," where as soon as one is found, it is made. If there are no forced moves, then unforced recursive exploration may be completed, but as will be seen, this is unnecessary in this simple example. Note also that where moves are forced, the order in which they are made is immaterial.

Figure 9D:
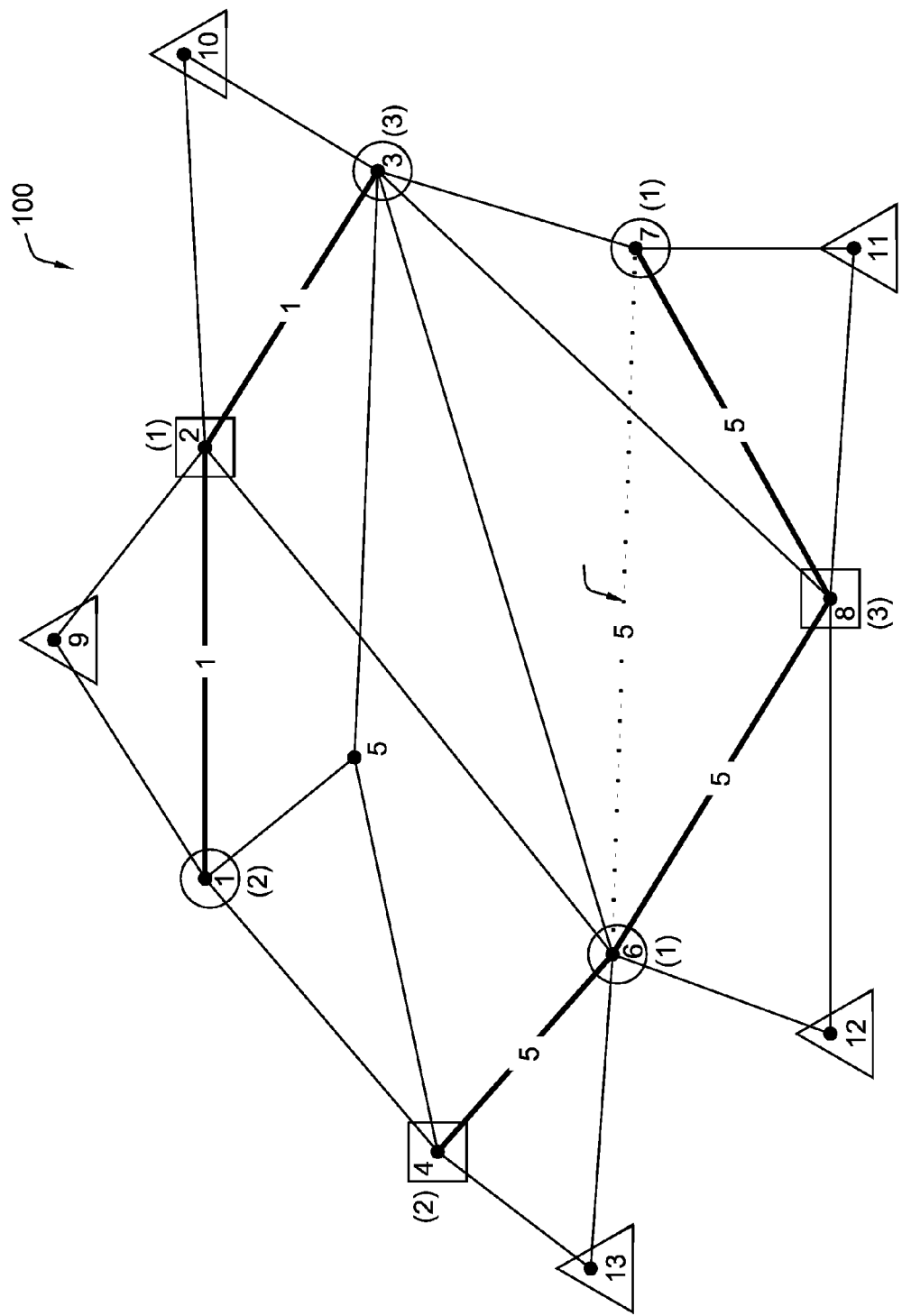

From examining the topology in FIG. 9C, it can be seen that all the nodes up to node 7 have multiple possible links. Since there are multiple possibilities for each of those nodes, there are no forced augmentations there. Note that even though nodes 7 and 3 have the same family, it would not be forced to join them because they are members of different duals, hence their family relationship is purely arbitrary and could change if one of the duals were to get flipped. However, since the link joining nodes 7 and 6 joins two nodes that have the same family color in the same dual, an appropriate forced move may be made. As shown in FIG. 9D link 7-6 (between nodes 7 and 6) may be added to dual 5. Note that as shown, links correspond to each family are illustrated as either dashed (family 1) or dotted (family 2). As such (marking any changes from previous states with an asterisk):

Dual 1:
Link 2-1->node 2 (Family 1, Group 1) and node 1 (Family 2, Group 2); and
Link 3-2->node 3 (Family 2, Group 3) and node 2 (Family 1, Group 1);

Dual 5:
   Link 6-4->node 6 (Family 2, Group 1) and node 4 (Family 1, Group 2);
   Link 8-6->node 8 (Family 1, Group 3) and node 6 (Family 2, Group 1);
   Link 8-7->node 8 (Family 1, Group 3) and node 7 (Family 2, Group 1*); and
      Link 7-6->node 7 (Family 2, Group 1) and node 6 (Family 2, Group 1).

Upon inspection of the arrangement in FIG. 9D, node 7 now has only a single non-dual link leaving it. However, as noted above, it does not result in a forced augmentation because nodes 6 and 7 are now members of the same group (having just been joined) and as such, there are multiple exits from that group: one at node 7 and two at node 6. At the same time, though, node 8 has only a single (non-dual) link and it does not share a group with any other node in the dual, so that is a forced move.

Figure 9E:
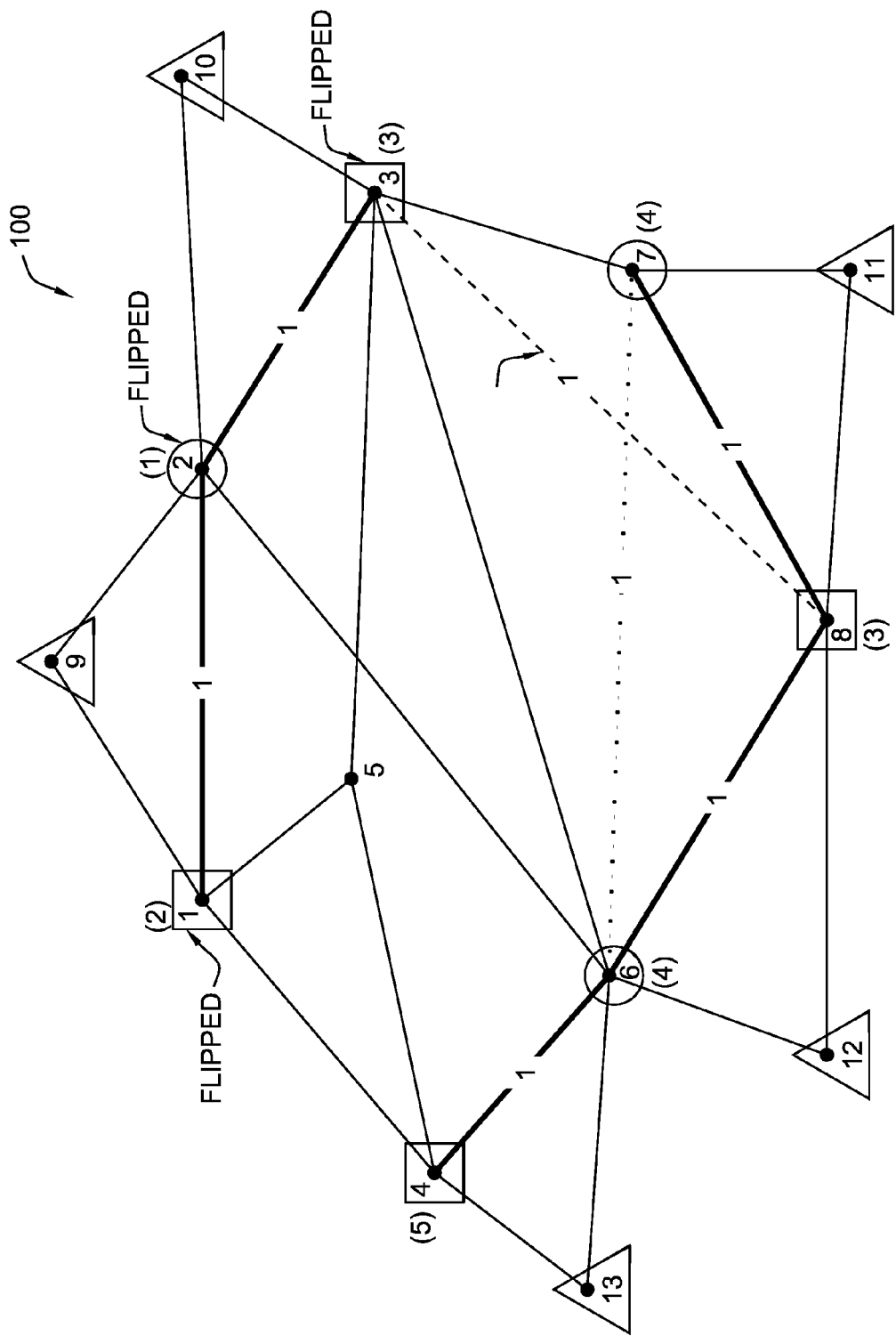

As shown in FIG. 9E, then, link 8-3 may be added to dual 5 as a forced augmentation. Notably, nodes 8 and 3 belong to different families (Family 1 and Family 2, respectively). In order to merge the two duals (dual 5 and dual 1, respectively), one of the two duals needs to be "flipped" to invert the family relationships of all the nodes in that flipped dual. Accordingly, the nodes of dual 1 may be flipped during (e.g., prior to or after) the merge of the two duals. Note that the choice of which dual to flip is arbitrary since it generally does not make a difference to the solution.

First, as a result of adding link 8-3 to dual 5:
Dual 1:
   Link 2-1->node 2 (Family 1, Group 1) and node 1 (Family 2, Group 2); and
   Link 3-2->node 3 (Family 2, Group 3) and node 2 (Family 1, Group 1);
Dual 5:
   Link 6-4->node 6 (Family 2, Group 1) and node 4 (Family 1, Group 2);
   Link 8-6->node 8 (Family 1, Group 3) and node 6 (Family 2, Group 1);
   Link 8-7->node 8 (Family 1, Group 3) and node 7 (Family 2, Group 1);
   Link 7-6->node 7 (Family 2, Group 1) and node 6 (Family 2, Group 1); and
      Link 8-3->node 8 (Family >1<, Group 3) and node 3 (Family >2<, Group 3).

And second, as a result of merging the two connected duals, e.g., once the family in one of the duals is inverted, as necessary (shown above as ">1<" and ">2<"):
Dual 1:
   Link 2-1->node 2 (Family 2, Group 1) and node 1 (Family 1, Group 2);
   Link 3-2->node 3 (Family 1, Group 3) and node 2 (Family 2, Group 1);
      Link 6-4->node 6 (Family 2, Group 4*) and node 4 (Family 1, Group 5*);
      Link 8-6->node 8 (Family 1, Group 3) and node 6 (Family 2, Group 4*);
      Link 8-7->node 8 (Family 1, Group 3) and node 7 (Family 2, Group 4*);
      Link 7-6->node 7 (Family 2, Group 4*) and node 6 (Family 2, Group 4*); and
      Link 8-3->node 8 (Family 1, Group 3) and node 3 (Family 1, Group 3).

Note further that as a result of merging the two duals, the group numbers may also need to be redefined for one of the duals, since the original numbering was merely arbitrary. In other words, since the numbers of the groups in each dual may overlap, certain group numbers (e.g., groups 1 and 2 of dual 5) may have to be given a new, unique number (e.g., 4 and 5, respectively, as shown above and in FIG. 9E).

Figure 9F:
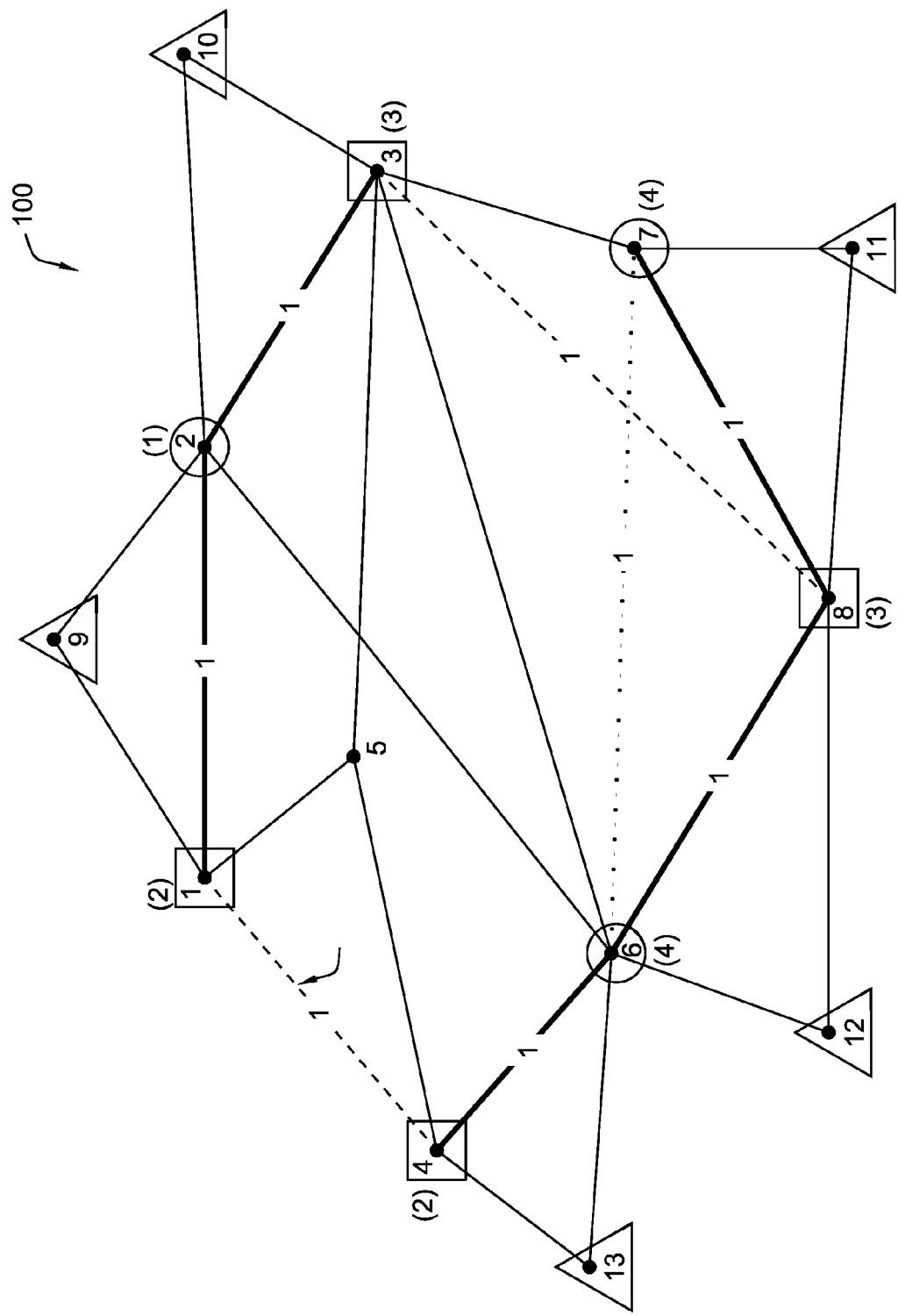

Node 1 has multiple unplaced links, but now the link to node 4 is a link between two nodes of the same dual with the same family, so that interconnecting link can be added to the dual and the corresponding family. As shown in FIG. 9F adding link 4-1 to dual 1:
Dual 1:
   Link 2-1->node 2 (Family 2, Group 1) and node 1 (Family 1, Group 2);
   Link 3-2->node 3 (Family 1, Group 3) and node 2 (Family 2, Group 1);
   Link 6-4->node 6 (Family 2, Group 4) and node 4 (Family 1, Group 2*);
   Link 8-6->node 8 (Family 1, Group 3) and node 6 (Family 2, Group 4);
   Link 8-7->node 8 (Family 1, Group 3) and node 7 (Family 2, Group 4);
   Link 7-6->node 7 (Family 2, Group 4) and node 6 (Family 2, Group 4);
   Link 8-3->node 8 (Family 1, Group 3) and node 3 (Family 1, Group 3); and
      Link 4-1->node 4 (Family 1, Group 2) and node 1 (Family 1, Group 2).

It is not a forced augmentation to add the "single" link from node 1 to node 5 because node 1 shares a group (Group 2) with node 4, thus there are multiple exits from the group (i.e., it is not certain whether to connect node 1 to node 5 or to connect node 4 to node 5). In one embodiment, it may be possible to determine that either connection would be a forced move since all the exits from that group go to a single node, so is whichever is chosen would result in that single node (node 5) having the same family. According to the simplified algorithm described herein, however, neither link 1-5 or 4-5 need be determined to be a forced move, so it can be left for exploration later.

Figure 9G:
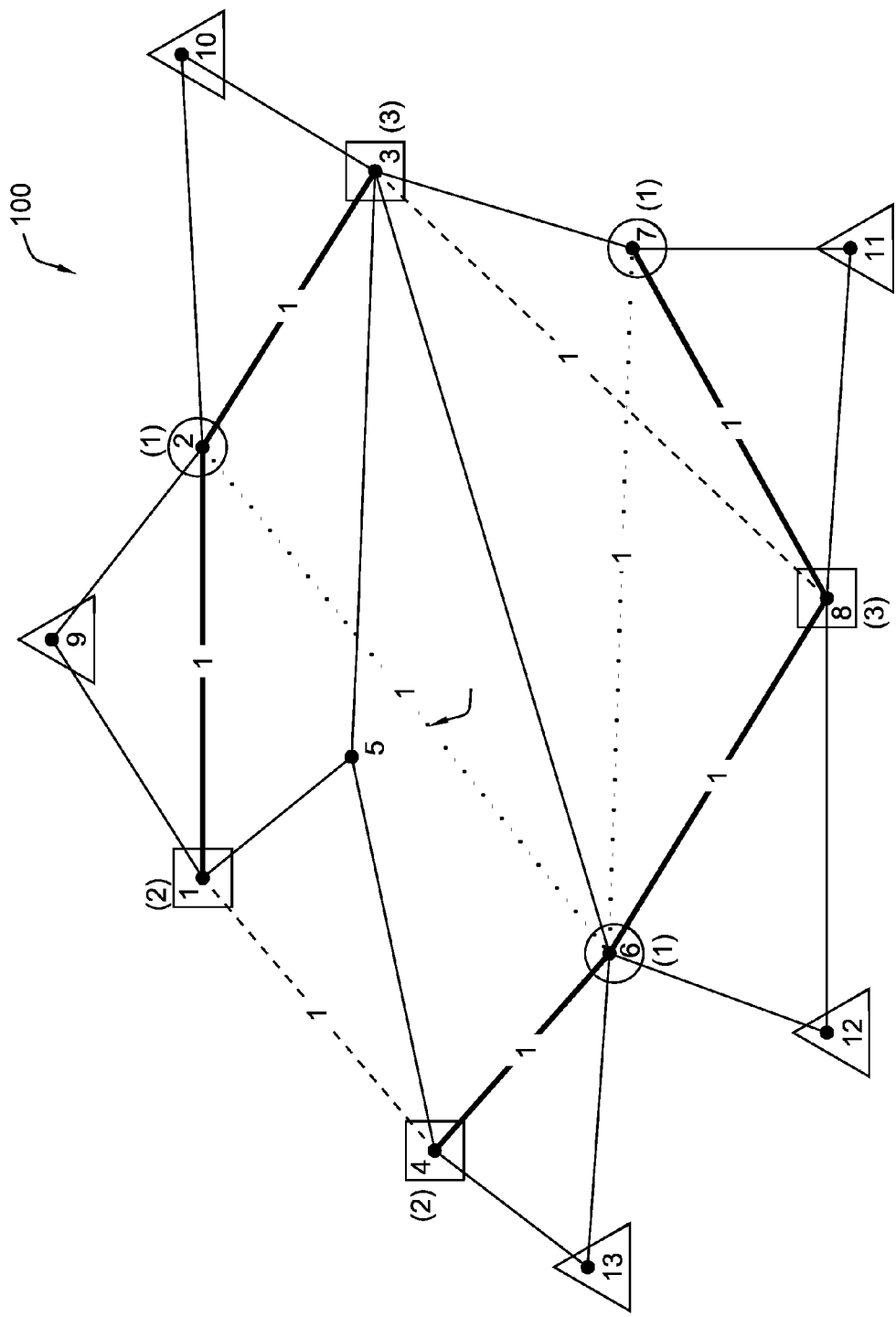

Since the link between node 6 and node 2 connects two nodes in the same dual with the same family, the link 6-2 can be forced. As shown in FIG. 9G, adding link 6-2 to dual 1:
Dual 1:
   Link 2-1->node 2 (Family 2, Group 1) and node 1 (Family 1, Group 2);
   Link 3-2->node 3 (Family 1, Group 3) and node 2 (Family 2, Group 1);
   Link 6-4->node 6 (Family 2, Group 1*) and node 4 (Family 1, Group 2);
   Link 8-6->node 8 (Family 1, Group 3) and node 6 (Family 2, Group 1*);
   Link 8-7->node 8 (Family 1, Group 3) and node 7 (Family 2, Group 1*);
   Link 7-6->node 7 (Family 2, Group 1*) and node 6 (Family 2, Group 1*);
   Link 8-3->node 8 (Family 1, Group 3) and node 3 (Family 1, Group 3);
   Link 4-1->node 4 (Family 1, Group 2) and node 1 (Family 1, Group 2); and
      Link 6-2->node 6 (Family 2, Group 1) and node 2 (Family 2, Group 1).

Figure 9H:
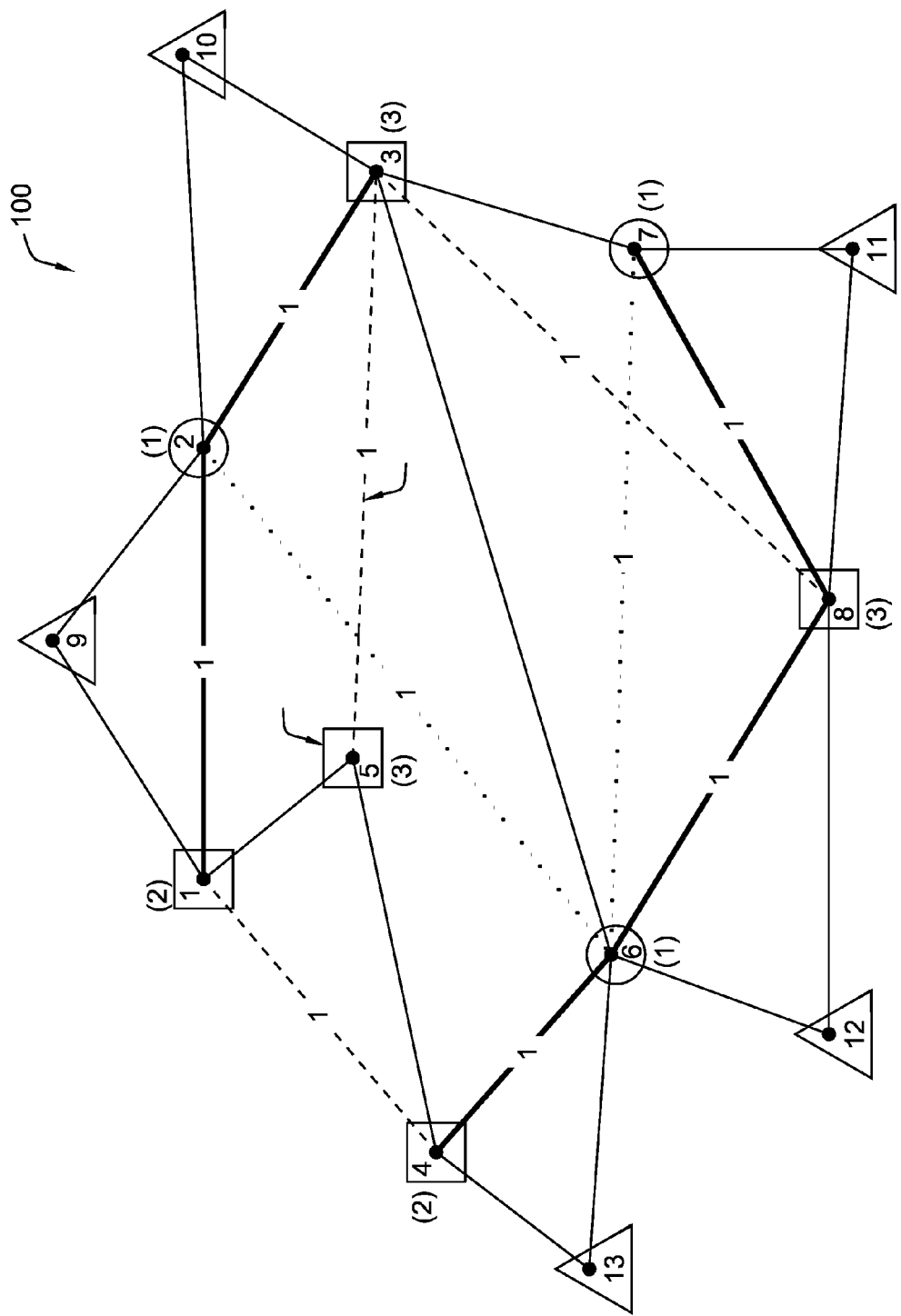

Still nothing can be done with node 1 (a member of a multi-node group that has multiple exits), nor can anything be done with node 2 (same reason). Node 3 has three unused links, however two of which would connect to nodes in the same dual with the opposite family, so those links can be eliminated. Although node 3 is a member of a multi-node group (Group 3 with node 3 and node 8), the other member of the group (node 8) has no available exits, and so this is not a multi-exit group. Hence we can add the link from node 3 to node 5. As shown in FIG. 9H, adding link 5-3 to dual 1:

Dual 1:
Link 2-1->node 2 (Family 2, Group 1) and node 1 (Family 1, Group 2);
Link 3-2->node 3 (Family 1, Group 3) and node 2 (Family 2, Group 1);
Link 6-4->node 6 (Family 2, Group 1) and node 4 (Family 1, Group 2);
Link 8-6->node 8 (Family 1, Group 3) and node 6 (Family 2, Group 1);
Link 8-7->node 8 (Family 1, Group 3) and node 7 (Family 2, Group 1);
Link 7-6->node 7 (Family 2, Group 1) and node 6 (Family 2, Group 1);
Link 8-3->node 8 (Family 1, Group 3) and node 3 (Family 1, Group 3);
Link 4-1->node 4 (Family 1, Group 2) and node 1 (Family 1, Group 2);
Link 6-2->node 6 (Family 2, Group 1) and node 2 (Family 2, Group 1); and
  Link 5-3->node 5 (Family 1, Group 3) and node 3 (Family 1, Group 3).

Figure 9I:
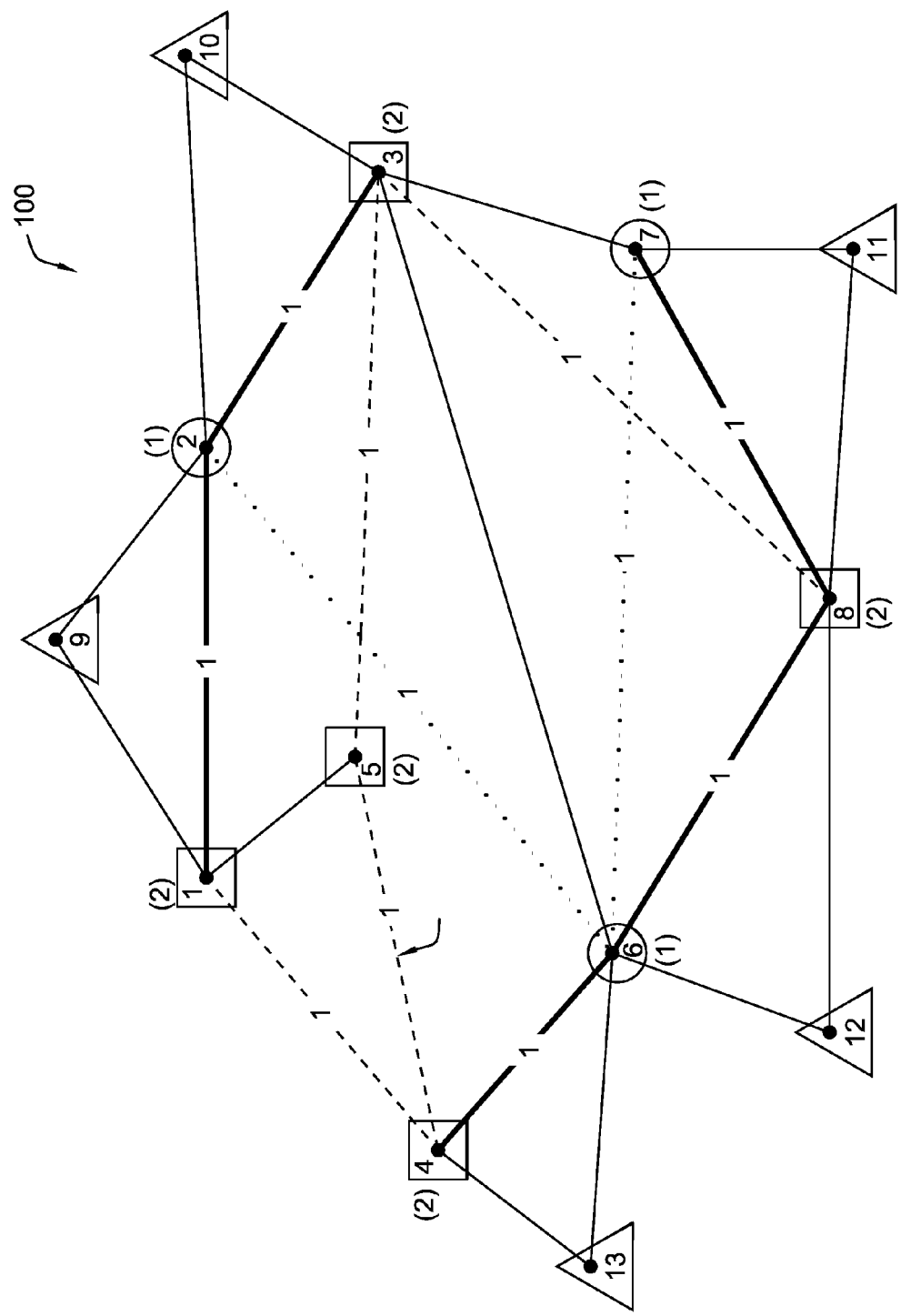

Finally, link 5-1 or link 5-4 may be added to the dual, and it makes no difference which since they are both forced because they join nodes in the same dual with the same color. With this addition, as shown in FIG. 9I:

Dual 1:
Link 2-1->node 2 (Family 2, Group 1) and node 1 (Family 1, Group 2);
Link 3-2->node 3 (Family 1, Group 2*) and node 2 (Family 2, Group 1);
Link 6-4->node 6 (Family 2, Group 1) and node 4 (Family 1, Group 2);
Link 8-6->node 8 (Family 1, Group 2*) and node 6 (Family 2, Group 1);
Link 8-7->node 8 (Family 1, Group 2*) and node 7 (Family 2, Group 1);
Link 7-6->node 7 (Family 2, Group 1) and node 6 (Family 2, Group 1);
Link 8-3->node 8 (Family 1, Group 2*) and node 3 (Family 1, Group 2*);
Link 4-1->node 4 (Family 1, Group 2) and node 1 (Family 1, Group 2);
Link 6-2->node 6 (Family 2, Group 1) and node 2 (Family 2, Group 1);
Link 5-3->node 5 (Family 1, Group 2*) and node 3 (Family 1, Group 2*); and
  Link 5-4->node1 (Family 1, Group 2) and node 4 (Family 1, Group 2).

Since there is now a single dual (dual 1) with only two groups (Group 1 and Group 2), a solution has been successfully reached, and it may be determined that the topology is, in fact, a dual plane topology (thus identifying a dual plane topology where each end-point node has two distinct node-diverse paths to each other end-point node). Note that additional forced (and/or unforced) augmentations may continue even after a solution is reached, such as for the purposes of fully identifying a dual plane topology, rather than simply determining whether one exists. For instance, by adding link 5-1 to the topology (forced between two nodes of a same family within a same dual), the topologies (singular family-group pairs) remain distinct, yet forwarding options may be given to various forwarding (e.g., routing) protocols, such as for MTR.

Recall also, that the links of the initial duals (that is, between the selected is neighbors of each end-point node) is disabled for traffic transmission on the dual plane topology. That is, any link that has nodes in different families (and hence, groups), is not a link in either topology, but was merely used to compute the dual topologies. As such, in this example, the following links have opposing families/groups, and are disabled:

Link 2-1->node 2 (Family 2, Group 1) and node 1 (Family 1, Group 2);
Link 3-2->node 3 (Family 1, Group 2) and node 2 (Family 2, Group 1);
Link 6-4->node 6 (Family 2, Group 1) and node 4 (Family 1, Group 2);
Link 8-6->node 8 (Family 1, Group 2) and node 6 (Family 2, Group 1); and
Link 8-7->node 8 (Family 1, Group 2) and node 7 (Family 2, Group 1).

Figure 10:
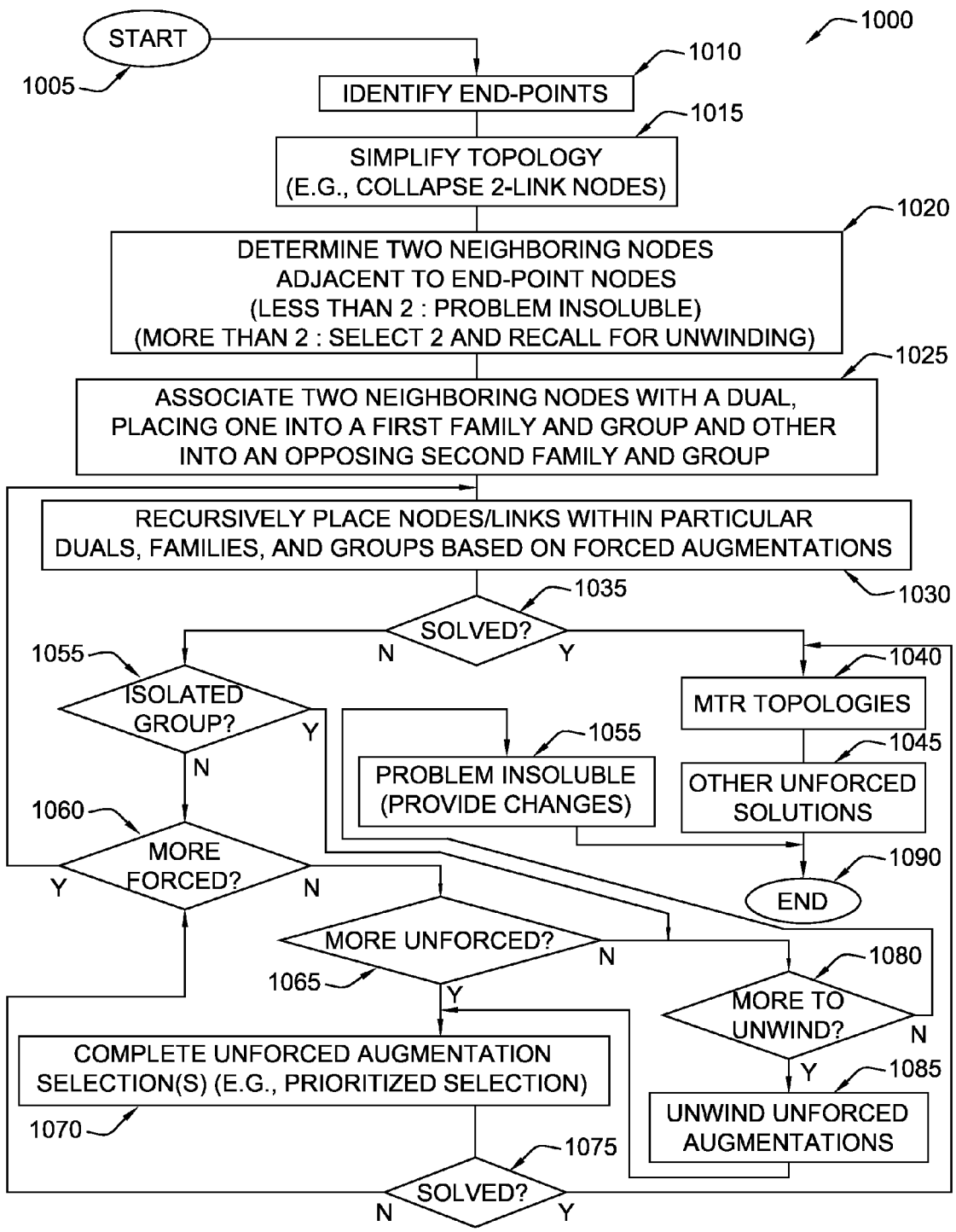
FIG. 10 illustrates an example procedure for identifying dual plane topologies.

FIG. 10 illustrates a simplified example procedure for identifying dual plane topologies in accordance with one or more embodiments described herein. The procedure 1000 starts at step 1005, and continues to step 1010, where a computing node (or nodes) identifies the end-point nodes in a particular network domain that desire dual topology connectivity to the other end-point nodes in the domain (e.g., nodes 9, 10, 11, 12, and 13). In step 1015, the topology may be simplified, such as by collapsing nodes with only two links into a representative link, as described above. In step 1020, two adjacent neighboring nodes may be determined for each end-point node, and in step 1025, those two neighboring nodes may be associated with a dual, specifically placing one into a first family (and group) and other into an opposing second family (and group). Notably, if only one neighboring node exists, no solution is possible for at least that end-point, while if more than two neighboring nodes exist, then two may be selected with the selection and alternatives recalled for possible unwinding if necessary as noted above (e.g., for additional solutions or to correct insolubility).

As described in substantially more detail above, in step 1030, nodes/links may be recursively placed within particular duals, families, and groups based on forced augmentations. These forced augmentations may result in a solution in step 1035, at which time MTR topologies may be established in step 1040 prior to the procedure 1000 ending in step 1090. (Note that step 1045 is not yet applicable.) If, on the other hand, there is no solution in step 1035 with solely forced augmentations, the procedure is continues so long as no forced augmentation creates an isolated group in step 1050. If an isolated group is created as described above in step 1050 (and there are no unforced augmentations to unwind in step 1080), then in step 1055 the problem is determined to be insoluble, and suggestions to correct any encountered problems may also be made prior to the procedure ending in step 1090. Conversely, if no isolated groups are created in step 1050, then any additional forced augmentations, as determined in step 1060, may be performed in step 1030, accordingly.

Once there are no further forced augmentations in step 1060, and no solution has yet been reached, then in step 1065 it may be determined whether any unforced augmentations may be made. If so, then in step 1070 an unforced augmentation selection may be completed, for instance, according to the one or more embodiments above (e.g., prioritized selection). If the unforced augmentation solves for dual plane topologies in step 1075, then, optionally, MTR topologies may be established in step 1040, and other unforced solutions may be explored in step 1045, if desired, prior to ending the procedure 1000 in step 1090. Alternatively, if the unforced augmentation itself does not create a solution in step 1075, then the procedure returns to step 1060 to determine whether the unforced augmentation selection created additional forced augmentations. If so, then the procedure returns to step 1030 to complete the forced augmentation(s). If there are no additional forced augmentations, then again the procedure continues to step 1065 to determine whether other unforced augmentations exist.

In response to there being no further forced or unforced augmentations in steps 1060 and 1065, and without having reached a solution in step 1075, or in response to an isolated group in step 1050 after unforced augmentations, then in step 1080 it may be determined whether any unforced augmentations may be unwound. If so, then as described in more detail above, the procedure 1000 may select a particular unforced augmentation to unwind in step 1085, and the procedure returns to step 1070 to continue with the newly selected unforced augmentation. The unwinding may be recursively repeated as available, such as exploring each decision tree until a solution is reached in step 1035 or 1075. If, on the other hand, after exploring all unforced augmentations through step 1080, then the problem is deemed insoluble in step 1055, and the procedure 1000 ends in step 1090 (e.g., after proposing changes to make the problem solvable, if so configured).

The novel techniques described herein identify dual plane topologies in a computer network. By simplifying the topology, performing any forced augmentations, and exploring combinations of remaining unforced augmentations, the novel techniques provide an analytic solution to determine dual plane topologies for any network topology, from those that are simple and can be analyzed "by eye" to those that are more complex and virtually impenetrable to manual discovery.

While there have been shown and described illustrative embodiments that identify dual plane topologies in a computer network, it is to be understood that various other adaptations and modifications may be made within the spirit and scope of the embodiments herein. For example, the embodiments have been shown and described herein with specific family numbering/coloring and node coloring. However, the embodiments in their broader sense are not so limited, and may, in fact, be used with other schemes, such as Boolean values (e.g., true or false), various numerical values or colors, etc. Further, while the techniques above are shown for use describing dual plane topologies, tri-plane (or greater) topologies may also be determined by creating initial duals from end-point nodes with three (or more) adjacent neighbors, and defining three (or more) families. In this situation, though perhaps not necessary by today's convention, a tri-plane (or greater) topology may be identified when the result of the forced and unforced augmentations described above is a single dual with three (or more) groups, i.e., one group for each family.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible, non-transitory, computer-readable medium (e.g., disks/CDs/etc.) having program instructions executing on a computer, hardware, firmware, or a combination thereof. Accordingly this description is to be taken is only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    associating, for each particular end-point node in a computer network domain that desires node-diverse dual plane topologies to each other end-point node in the domain, two neighboring nodes adjacent to the particular end-point node with a dual, wherein a dual is created for each end-point node, a dual being a logical structure that represents a collection of nodes and links placed in one of either a first family or an opposing second family, where a family has one or more groups, each group representing a collection of nodes and links within a particular family that have connectivity to one another without traversing nodes in another family;
    placing a first of the two neighboring nodes for each dual into a first family and group of that dual and placing a second of the two neighboring nodes of that dual into an opposing second family and group of that dual;
    recursively performing, by one or more processors, one or more augmentations, wherein the augmentations are each one of either a forced augmentation or an unforced augmentation, each unforced augmentation performed only when no forced augmentations exist; and
    determining, by the one or more processors, whether the domain supports dual plane topologies based on whether a solution having one resultant dual with a single group in each opposing family is reached from the recursive augmentations.

2. The method as in claim 1, wherein performing an augmentation comprises at least one of:
    merging duals that share a placed node;
    connecting duals that do not share a placed node over a link between placed nodes of each dual and merging the connected duals;
    connecting groups of a same family of a particular dual over a link between placed nodes of the particular dual; and
    connecting unplaced nodes to a particular dual over a link between a placed node of the particular dual and the unplaced node to place the unplaced nodes in the particular dual and a corresponding family and group of the connected placed node.

3. The method as in claim 1, wherein a forced augmentation comprises one of:
    in response to a single link exiting a particular group, placing the single link and node across that single link in the particular group;
    in response to the single link connecting two nodes of a same particular family of two distinct duals, placing the single link in the particular family and merging the two distinct duals into a single dual over the single link; and
    in response to the single link connecting two nodes of opposing families of two distinct duals, inverting the family of all of the nodes of one of the two distinct duals such that the two connected nodes are in a same family and merging the two distinct duals into a single dual over the single link.

4. The method as in claim 1, further comprising:
    in response to a forced augmentation placing a node such that a group becomes isolated with no feasible links to connect to other nodes of that group, determining that the domain does not support dual plane topologies.

5. The method as in claim 1, wherein an unforced augmentation comprises:
    determining a plurality of possible augmentations over links from a particular node; and selecting one of the plurality of possible augmentations to connect the particular node over a selected link to a second node.

6. The method as in claim 5, further comprising:
in response to insolubility having resulted from at least one unforced augmentation selection, unwinding one or more unforced augmentations to select one or more alternative possible augmentations.

7. The method as in claim 5, wherein selecting comprises:
prioritizing selection of the link to the second node based on:
first, selecting a link which would connect two duals,
second, selecting a link which would connect two groups of the same family on the same dual, and
third, selecting a link arbitrarily.

8. The method as in claim 1, wherein determining whether the domain supports dual plane topologies comprises:
determining that the domain does not support dual plane topologies based on exploring all unforced augmentations without reaching the solution having one resultant dual with a single group in each opposing family.

9. The method as in claim 1, wherein the solution having one resultant dual with a single group in each opposing family is reached without any unforced augmentations.

10. The method as in claim 1, further comprising:
in response to determining that the domain supports dual plane topologies based on a solution reached via one or more selected unforced augmentations, determining whether other solutions exist via alternative unforced augmentation selections.

11. The method as in claim 1, further comprising:
simplifying the computer network domain by recursively replacing nodes with exactly two links to respective first and second neighbors with a link between the first and second neighbors.

12. The method as in claim 11, further comprising:
in response to determining that the domain supports dual plane topologies, placing each replaced node into a family and group corresponding to the family and group of the respective link replacing that node in the solution.

13. The method as in claim 1, further comprising:
in response to an end-point having only a single adjacent neighbor, determining that the domain does not support dual plane topologies for at least that end-point.

14. The method as in claim 1, wherein determining two neighboring nodes adjacent to a particular end-point node comprises:
determining that the particular end-point node has more than two neighbors; and, in response,
selecting two of the neighbors as an unforced augmentation selection that is eligible for unwinding.

15. The method as in claim 1, wherein the method is performed on a plurality of distributed nodes within the computer network domain, each of the plurality of nodes utilizing a same selection algorithm for any selections to be made while performing the method.

16. The method as in claim 1, further comprising:
translating, in response to determining that the domain supports dual plane topologies, at least one of either the two opposing families or their corresponding groups into opposing multi-topology routing (MTR) topologies.

17. The method as in claim 1, further comprising:
determining, in response to determining that the domain does not support dual plane topologies, one or more topology changes to allow the domain to support dual plane topologies.

18. A tangible, non-transitory, computer-readable media having software encoded thereon, the software when executed by a processor configured to:
associate, for each particular end-point node in a computer network domain that desires node-diverse dual plane topologies to each other end-point node in the domain, two neighboring nodes adjacent to the particular end-point node with a dual, wherein a dual is created for each end-point node, a dual being a logical structure that represents a collection of nodes and links placed in one of either a first family or an opposing second family, where a family has one or more groups, each group representing a collection of nodes and links within a particular family that have connectivity to one another without traversing nodes in another family;
place a first of the two neighboring nodes for each dual into a first family and group of that dual and placing a second of the two neighboring nodes of that dual into an opposing second family and group of that dual;
recursively perform one or more augmentations, wherein the augmentations are each one of either a forced augmentation or an unforced augmentation, each unforced augmentation performed only when no forced augmentations exist; and
determine whether the domain supports dual plane topologies based on whether a solution having one resultant dual with a single group in each opposing family is reached from the recursive augmentations.

19. The computer-readable media as in claim 18, wherein the software when executed is further configured to perform an augmentation by:
merging of duals that share a placed node;
connection of duals that do not share a placed node over a link between placed nodes of each dual and merging of the connected duals;
connection of groups of a same family of a particular dual over a link between placed nodes of the particular dual; and
connection of unplaced nodes to a particular dual over a link between a placed node of the particular dual and the unplaced node to place the unplaced nodes in the particular dual and a corresponding family and group of the connected placed node.

20. The computer-readable media as in claim 18, wherein the software when executed is further configured to place an intermediate node based on a forced augmentation by:
in response to a single link exiting a particular group, placement of the single link and node across that single link in the particular group;
in response to the single link connecting two nodes of a same particular family of two distinct duals, placement of the single link in the particular family and merging of the two distinct duals into a single dual over the single link; and
in response to the single link connecting two nodes of opposing families of two distinct duals, inversion of the family of all of the nodes of one of the two distinct duals such that the two connected nodes are in a same family and merging of the two distinct duals into a single dual over the single link.

21. The computer-readable media as in claim 18, wherein the software when executed is further configured to:
simplify the computer network domain by recursive replacement of nodes with exactly two links to respective first and second neighbors with a link between the first and second neighbors.

22. The computer-readable media as in claim 18, wherein the software when executed is further configured to:
   determine that the domain does not support dual plane topologies in response to one of: i) exploration of all unforced augmentations without reaching the solution having one resultant dual with a single group in each opposing family; ii) a forced augmentation placing an intermediate node such that a group becomes isolated with no feasible links to connect to other intermediate nodes of that group, and iii) an end-point having only a single adjacent neighbor.

23. The computer-readable media as in claim 18, wherein the software when executed is further configured to perform unforced augmentations by:
   determination of a plurality of possible augmentations over links from a particular node;
   selection of one of the plurality of possible augmentations to connect the particular node over a selected link to a second node; and
   in response to insolubility having resulted from at least one unforced augmentation selection, unwinding of one or more unforced augmentations to select one or more alternative possible augmentations.

24. The computer-readable media as in claim 23, wherein the software when executed is further configured to perform unforced augmentation selection by:
   prioritization of the link selection based on:
      first, selecting a link which would connect two duals,
      second, selecting a link which would connect two groups of the same family on the same dual, and
      third, selecting a link arbitrarily.

25. An apparatus, comprising:
   one or more network interfaces;
   a processor coupled to the network interfaces and adapted to execute one or more processes; and
   a memory configured to store a process executable by the processor, the process when executed configured to:
      associate, for each particular end-point node in a computer network domain that desires node-diverse dual plane topologies to each other end-point node in the domain, two neighboring nodes adjacent to the particular end-point node with a dual, wherein a dual is created for each end-point node, a dual being a logical structure that represents a collection of nodes and links placed in one of either a first family or an opposing second family, where a family has one or more groups, each group representing a collection of nodes and links within a particular family that have connectivity to one another without traversing nodes in another family;
      place a first of the two neighboring nodes for each dual into a first family and group of that dual and placing a second of the two neighboring nodes of that dual into an opposing second family and group of that dual;
      recursively perform one or more augmentations, wherein the augmentations are each one of either a forced augmentation or an unforced augmentation, each unforced augmentation performed only when no forced augmentations exist; and
      determine whether the domain supports dual plane topologies based on whether a solution having one resultant dual with a single group in each opposing family is reached from the recursive augmentations.

26. A method, comprising:
   associating, for each particular end-point node in a domain that desires node-diverse dual plane topologies to other end-point nodes in the domain, two neighboring nodes adjacent to the particular end-point node with a logical structure that represents a collection of nodes and links placed in one of either a first family or an opposing second family, where a family has one or more groups representing a collection of nodes and links that have connectivity to one another without traversing nodes in another family;
   placing a first of the two neighboring nodes for each logical structure into a first family and group of that logical structure and placing a second of the two neighboring nodes of that logical structure into an opposing second family and group of that logical structure;
   recursively performing, by one or more processors, one or more augmentations on logical structures; and
   determining, by the one or more processors, whether the domain supports dual plane topologies based on whether a solution having one resultant logical structure with a single group in each opposing family is reached from the recursive augmentations.

27. The method as in claim 26, wherein performing an augmentation comprises at least one of:
   merging logical structures that share a placed node;
   connecting logical structures that do not share a placed node over a link between placed nodes of each of the logical structures and merging the connected logical structures;
   connecting groups of a same family of a particular logical structure over a link between placed nodes of the particular logical structure; and
   connecting unplaced nodes to a particular logical structure over a link between a placed node of the particular logical structure and the unplaced node to place the unplaced nodes in the particular logical structure and a corresponding family and group of the connected placed node.

* * * * *

UNITED STATES PATENT AND TRADEMARK OFFICE
CERTIFICATE OF CORRECTION

PATENT NO. : 8,462,664 B2
APPLICATION NO. : 12/899013
DATED : June 11, 2013
INVENTOR(S) : Ian Michael Charles Shand et al.

Page 1 of 2

It is certified that error appears in the above-identified patent and that said Letters Patent is hereby corrected as shown below:

In the Specification:

In col. 1, line 58 should read:
be "unwound") where no ~~is~~ forced augmentations exist. In the In col. 2, line 32 should read:
divide an AS into ~~is~~ multiple "areas" or "levels." It may be In col. 3, line 8 should read:
connected by a ~~is~~ system bus 250. The network interfaces 210

In col. 3, line 51 should read:
(BGP), etc., as will be understood by ~~is~~ those skilled in the art.

In col. 5, line 40 should read:
simplifications, and ~~is~~ as such, may also be removed and In col. 6, line 58 should read:
may be performed ~~is~~ when no forces augmentations, accordingly, In col. 7, line 47 should read:
is in a different family from modes ~~1~~ l and m of that dual, then In col. 8, line 4 should read:
example, this ~~is~~ may occur where there are two or more In col. 9, line 19 should read:
connectivity. For example, as shown in FIG. 8B, ~~is~~ assuming Signed and Sealed this
Thirtieth Day of July, 2013

Teresa Stanek Rea
*Acting Director of the United States Patent and Trademark Office*

CERTIFICATE OF CORRECTION (continued)
U.S. Pat. No. 8,462,664 B2

In col. 12, line 32 should read:
since all that exits from that group go to a single node, so ~~is~~

In col. 13, line 67 should read:
between the selected ~~is~~ neighbors of each end-point node) is In col. 14, line 45 should read:
augmentations, the procedure ~~is~~ continues so long as no In col. 15, line 63 should read:
tion is to be taken ~~is~~ only by way of example and not to